United States Patent
Prieur et al.

(10) Patent No.: US 12,296,283 B2
(45) Date of Patent: May 13, 2025

(54) REGULATED METHOD FOR SEPARATING A MIXTURE

(71) Applicant: Novasep Process Solutions, Saint-Maurice-de-Beynost (FR)

(72) Inventors: Cédric Prieur, Genas (FR); Eric Valéry, Saulxures-les-Nancy (FR)

(73) Assignee: Novasep Process Solutions, Saint-Maurice-de-Beynost (FR)

( * ) Notice: Subject to any disclaimer, the term of this patent is extended or adjusted under 35 U.S.C. 154(b) by 0 days.

(21) Appl. No.: 18/509,006

(22) Filed: Nov. 14, 2023

(65) Prior Publication Data
US 2024/0075405 A1    Mar. 7, 2024

Related U.S. Application Data

(63) Continuation of application No. 16/762,457, filed as application No. PCT/FR2018/052871 on Nov. 16, 2018, now Pat. No. 11,857,892.

(30) Foreign Application Priority Data

Nov. 16, 2017   (FR) ...................................... 1760830

(51) Int. Cl.
   *B01D 15/00*    (2006.01)
   *B01D 15/18*    (2006.01)
   (Continued)

(52) U.S. Cl.
   CPC ....... *B01D 15/1828* (2013.01); *B01D 15/185* (2013.01); *C13K 1/04* (2013.01); *C13K 11/00* (2013.01)

(58) Field of Classification Search
   None
   See application file for complete search history.

(56) References Cited

U.S. PATENT DOCUMENTS

| 3,826,905 A | 7/1974 | Valkama et al. |
| 5,457,260 A | 10/1995 | Holt |

(Continued)

FOREIGN PATENT DOCUMENTS

| CN | 1627067 A | 6/2005 |
| CN | 102574026 A | 7/2012 |

(Continued)

OTHER PUBLICATIONS

Chinese Second Office Action, Appl. 201880074260.X with English translation of Chinese Second Office Action dated Mar. 17, 2022; Common Knowledge Evidence, ISBN 978-7-5026-3278-6, (2010) cited by Chinese Patent Office in Second Office Action with partial English translation of the Common Knowledge Evidence.

(Continued)

*Primary Examiner* — Stefanie J Cohen
(74) *Attorney, Agent, or Firm* — Hamilton, Brook, Smith & Reynolds, P.C.

(57) ABSTRACT

The invention relates to a method for separating a mixture in a system comprising a plurality of chromatography columns, the method successively comprising, in a cyclical manner, in a given part of the system, steps of collecting a raffinate, injecting the mixture to be separated, collecting an extract and injecting a mobile phase; wherein the method further comprises measuring the purity and/or yield of a collected fraction, comprising: the determination, in a node of the system, of the histories of at least two variables that are representative of the concentration of at least two species contained in the mixture to be separated using at least one fast online detector; the determination of the concentration of at least two species of the mixture to be separated in the collected fraction based on these histories; and the determination of the purity and/or yield of the collected fraction based on these concentrations.

20 Claims, 12 Drawing Sheets

(51) Int. Cl.
*C13K 1/04* (2006.01)
*C13K 11/00* (2006.01)

(56) References Cited

U.S. PATENT DOCUMENTS

| | | | |
|---|---|---|---|
| 5,762,806 | A | 6/1998 | Hotier |
| 5,902,486 | A | 5/1999 | Couenne et al. |
| 6,063,284 | A | 5/2000 | Grill |
| 6,217,774 | B1 | 4/2001 | Nagamatsu et al. |
| 6,696,616 | B2 | 2/2004 | Pavone et al. |
| 8,282,831 | B2 | 10/2012 | Kessler et al. |
| 11,857,892 | B2 | 1/2024 | Prieur et al. |
| 12,214,297 | B2 | 2/2025 | Prieur et al. |
| 2002/0055665 | A1 | 5/2002 | Pavone et al. |
| 2005/0121392 | A1 | 6/2005 | Hoffman |
| 2006/0006113 | A1 | 1/2006 | Couenne et al. |
| 2010/0186587 | A1 | 7/2010 | Kessler et al. |
| 2011/0000853 | A1* | 1/2011 | Valery ............ B01D 15/1828 210/659 |
| 2011/0030457 | A1 | 2/2011 | Valery et al. |
| 2011/0073548 | A1 | 3/2011 | Williams et al. |
| 2012/0108841 | A1 | 5/2012 | Tenedorio et al. |
| 2013/0260419 | A1 | 10/2013 | Ransohoff et al. |
| 2015/0165343 | A1 | 6/2015 | Geng |
| 2015/0231528 | A1 | 8/2015 | Alberti et al. |
| 2021/0017561 | A1 | 1/2021 | Ransohoff et al. |
| 2021/0023474 | A1 | 1/2021 | Prieur et al. |
| 2024/0082752 | A1 | 3/2024 | Prieur et al. |

FOREIGN PATENT DOCUMENTS

| | | | |
|---|---|---|---|
| CN | 103562145 | A | 2/2014 |
| DE | 2237790 | A1 | 5/1973 |
| DE | 19842550 | A1 | 3/2000 |
| EP | 0875268 | A1 | 11/1998 |
| EP | 0878222 | A1 | 11/1998 |
| EP | 1982752 | A1 | 10/2008 |
| EP | 2711063 | A1 | 3/2014 |
| FR | 2762793 | A1 | 11/1998 |
| FR | 2808270 | A1 | 11/2001 |
| FR | 2843893 | A1 | 3/2004 |
| JP | 62-014059 | A | 1/1987 |
| JP | 07-323203 | A | 12/1995 |
| JP | 08-155206 | A | 6/1996 |
| TW | 386041 | B | 4/2000 |
| WO | 2007/101944 | A2 | 9/2007 |
| WO | 2019/097180 | A1 | 5/2019 |

OTHER PUBLICATIONS

First Examination Report, Indian Application No/ 202017022494, Dated Nov. 17, 2021, 6 pages.
International Search Report and Written Opinion (and english-translation of Search Report) for U.S. International Application No. PCT/FR2018/052871, entitled: "Regulated Method For Separating a Mixture," Dated Mar. 20, 2019.
International Search Report and Written Opinion (and english-translation of Search Report) for U.S. International Application No. PCT/FR2018/052872, entitled: "Process For Separating a Mixture With Measurement of Purity or Yield on an Intermediate Tank," Dated Mar. 20, 2019.
International Search Report and Written Opinion (and english-translation of Search Report) for U.S. International Application No. PCT/FR2018/052873, entitled: "Process For Separating a Mixture With Measurement of Purity or Yield by an Online Detector," Dated Mar. 20, 2019.
International Search Report and Written Opinion received for PCT Patent Application No. PCT/FR2018/052871, mailed on Mar. 20, 2019, 19 pages (8 pages of English Translation and 11 pages of Original Document).
Notification of the First Office Action for Chinese Application No. 201880074173.4 titled: Regulated Process For Separating A Mixture, Date ofIssuing: Jul. 22, 2021 (With English Translation).
Notification of the First Office Action for Chinese Application No. 201880074182.3, titled: Method For Separating A Mixture With Measurement Of Purity Or Yield On An Intermediate Vessel, Date ofIssuing: Jul. 9, 2021 (With English Translation).
Notification of the First Office Action for Chinese Application No. 201880074260.X, titled: Method For Separating A Mixture With Measurement Of Purity Or Yield By An In-Line Detector, Date ofIssuing: Jul. 12, 2021 (With English Translation).
Schramm et al., "Optimal operation of simulated moving bed chromatographic processes by means of simple feedback Control," Journal of Chromatography A, 1006 (2003), pp. 3-13.
Notice of Allowance and Fee(s) Due (PTOL-85) Mailed on Sep. 30, 2024 for U.S. Appl. No. 18/509,100, 23 pages.
Corrected Notice of Allowance mailed Oct. 25, 2024 for U.S. Appl. No. 18/509,100, 6 pages.

* cited by examiner

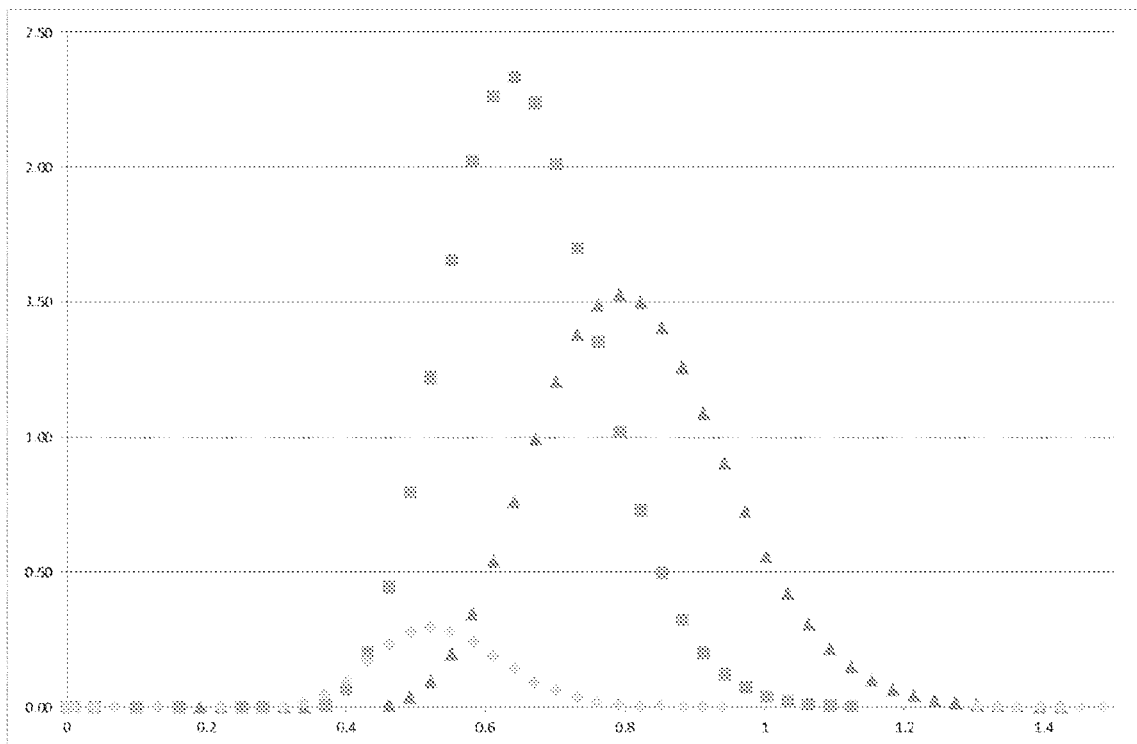
FIG. 5.A
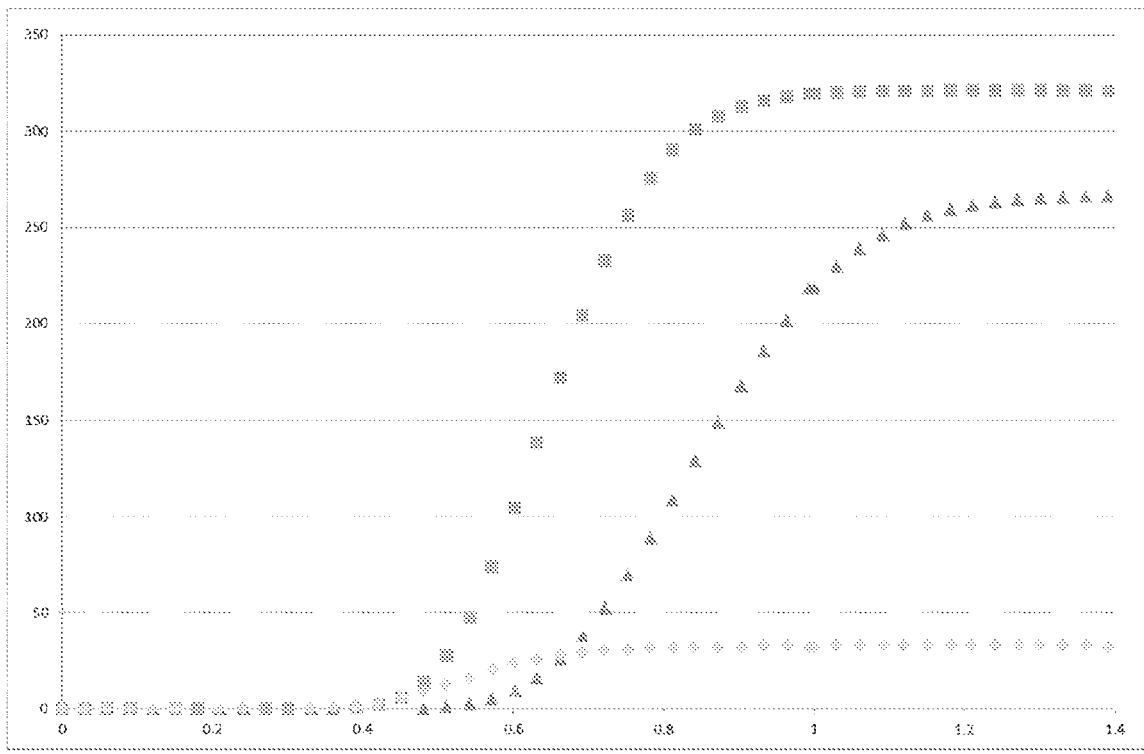
FIG. 5.B

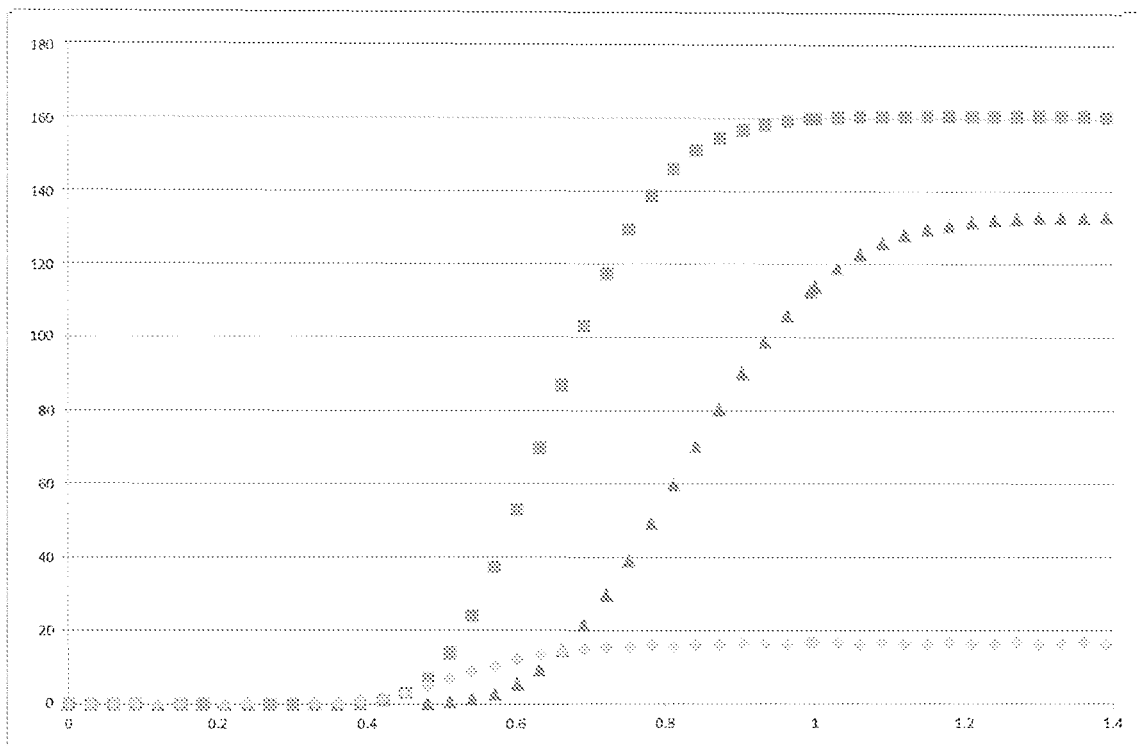
FIG. 5.C
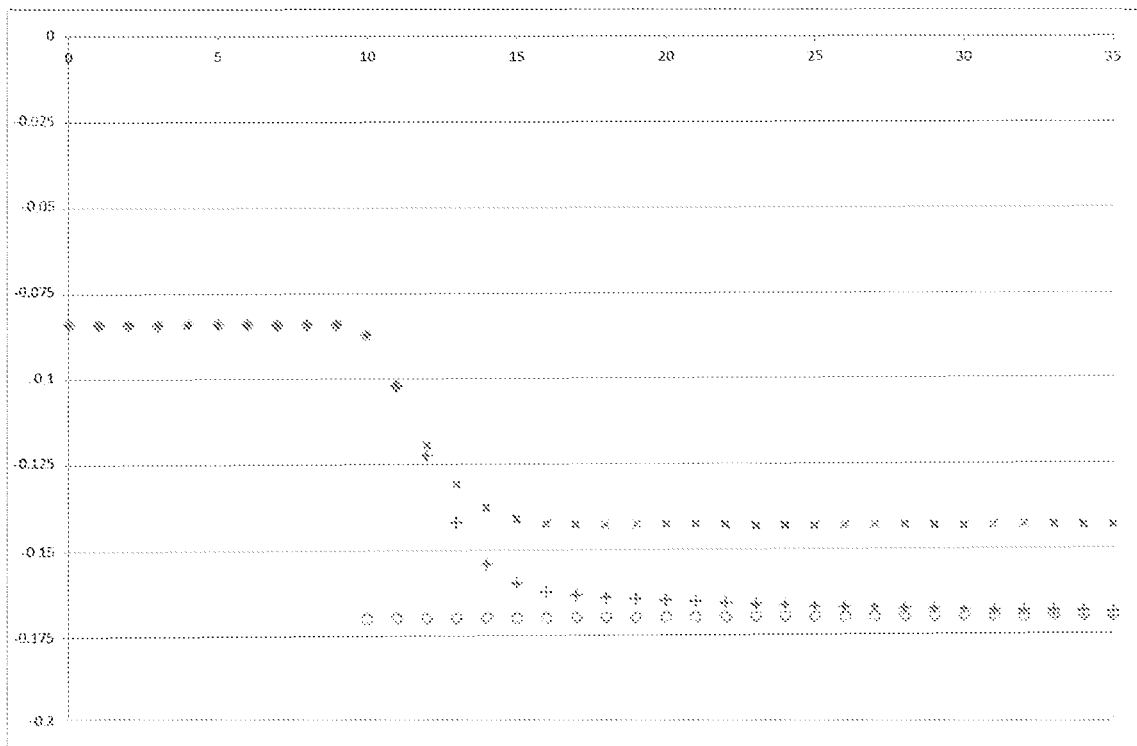
FIG. 6

REGULATED METHOD FOR SEPARATING A MIXTURE

RELATED APPLICATIONS

This application is a continuation of U.S. application Ser. No. 16/762,457, filed on May 7, 2020, now U.S. Pat. No. 11,857,892, which is the U.S. National Stage of International Application No. PCT/FR2018/052871, filed on Nov. 16, 2018, which designates the U.S., published in French and claims priority under 35 U.S.C. § 119 or 365(c) to French Application No. 1760830, filed on Nov. 16, 2017. The entire teachings of the above applications are incorporated herein by reference.

FIELD OF THE INVENTION

The present invention relates to a chromatographic method for the separation of a mixture.

TECHNICAL BACKGROUND

Chromatography is a separation technique based on the difference in distribution of the compounds in a mixture between a mobile phase and a stationary phase. The compounds are separated by percolating a mobile phase comprising a liquid, gaseous or supercritical solvent in a device (referred to as a column or cell) filled with stationary phase, wherein separation is effected when all or part of the compounds have a different percolation speed compared to the remainder. This method is implemented as an analysis technique in order to identify and quantify the compounds of a mixture. It may also be used as a purification technique.

As a function of the needs, various chromatographic methods are used to carry out the purification of molecules. Some are described in the document *Large Scale Adsorption and Chromatography*, P. C. Wankat, CRC press, Boca-Raton, 1986, *Adsorption and Ion Exchange*, M. D. Le Van et al., Perry's Chemical Engineers' Handbook 7$^{th}$ edition, Section 16, Mac-Graw-Hill, N-1, 1997, and the document *Choice and optimization of operating mode in industrial chromatography*, R. M. Nicoud et al., Proceeding of the 9th International Symposium on preparative and industrial chromatography, PREP 92, April 1992, Nancy, p. 205-220. These methods may be classified according to several criteria: the method may be either discontinuous or continuous, the systems may have one or more columns, the composition of the eluent may be isocratic, or a gradient may be used.

Several methods for regulating these methods have been described, in particular in the documents FR 2699917, U.S. Pat. No. 5,457,260, FR 2762793, DE 19842550, US 2005/0107895 and the article *Optimal operation of simulated moving bed chromatography methods by means of simple feedback control*, H. Schramm et al., Journal of Chromatography A, 2003, vol. 1006, p. 3-13.

Document EP 0878222 describes an SMB device comprising at least one concentration detector located in the fluid circulation passage, means located in the outlet lines for measuring the concentration of a compound in the extract and/or in the raffinate, and an operation controller to determine the conditions for controlling the operation of the device based on the concentration data from the concentration detector and the means located in the outlet lines.

Document WO 2007/101944 describes a chromatographic method in which a detector determines the history of a variable at a node of the chromatography device. On this history are detected a characteristic point located in an area between a raffinate collection and a successive extract collection including the injection of the mixture to be separated, a characteristic point located on the adsorption front, a characteristic point located on the desorption front, wherein the positions of these points are compared against target positions. The amount of mobile phase in the areas carrying these characteristic points is then adjusted to make the position of the characteristic points coincide with their target position.

This method makes it possible, in particular, to maximize the quantity of mixture treated but suffers from the drawback of not allowing control of the quantity of mobile phase injected. However, in certain applications, it is useful to be able to control as closely as possible the volume of mobile phase used for the separation of the compounds of a mixture, in particular in order to control the consumption of eluent or the amount of energy necessary for the concentration of the purified products. In addition, if the volume of eluent injected is too low, the viscosity of the fractions collected may become too high, which may be disadvantageous with a view to their subsequent treatment, in particular their passage through an evaporator.

There is, therefore, a need to provide a method for regulating a chromatographic separation, in which the operating parameters are optimized to satisfy constraints of purity or yield, while allowing precise control of the volume of mobile phase injected, and not requiring the use of a separation model or a complex algorithm.

In addition, in a multicolumn cyclic chromatography method and at any point in the chromatographic system, the concentrations of the species constantly change periodically. However, there may be asymmetries in the chromatographic system which induce differences in the composition of the fractions collected from one column to another.

Obtaining the precise purity of a collected fraction often requires, therefore, the use of an offline sample collection device which takes a sample of the fluids leaving the chromatographic system (i.e. the fluids in the outlet lines), at least over a period, and preferably over a cycle. This offline device allows a representative fluid to be stored, this fluid being isolated and then analyzed, wherein this analysis requires a certain time to be carried out. Between each analysis, the offline sample collection device is purged, cleaned and prepared for a new measurement. In addition to making the analysis device more complex, these purging, cleaning and preparation steps may prevent a measurement from being made during each cycle.

There is, therefore, a need to provide a simplified method for measuring the purity of a collected fraction, thus making it possible to dispense with an offline collection device dedicated to the analysis of the samples taken from the outlet lines.

SUMMARY OF THE INVENTION

The invention relates firstly to a method of separating a mixture in a system comprising a plurality of chromatography columns, the method successively comprising, in a cyclic manner and in a given part of the system:
  a step of collecting a raffinate, a step of injecting the mixture to be separated, a step of collecting an extract and a step of injecting a mobile phase;
  the method further comprising:
  the determination, in a node of the system, of the history of a variable representative of the concentration of one or more species contained in the mixture to be separated;

the detection on said history of a characteristic point between the start of a step of collecting the extract and the end of the following step of collecting the raffinate;

the comparison of the position of the characteristic point against a target position;

the adjustment of the volume carrying the characteristic point, modifying the position of the characteristic point to bring the position of the characteristic point closer to the target position;

the volume of the mobile phase injected per cycle being maintained greater than, or equal to, a minimum limit and/or less than or equal to a maximum limit.

According to embodiments, the system comprises areas 1, 2, 3 and 4, area 1 being located between a mobile phase injection line and a line for collecting the extract, area 2 being located between said line for collecting the extract and a line for injecting the mixture to be separated, area 3 being located between said line for injecting the mixture to be separated and a line for collecting the raffinate, and area 4 being located between said line for collecting the raffinate and said mobile phase injection line, and the volume carrying the characteristic point is the carrying volume of area 1 or the carrying volume of area 4.

According to embodiments, the volume of mobile phase injected per cycle is maintained at a constant value.

According to embodiments, the target position of the characteristic point is defined relative to the position of the step of injecting the mobile phase and/or to the position of the step of collecting the extract and/or to the position of the step of collecting the raffinate.

According to embodiments, the variable that is representative of the concentration of one or more species contained in the mixture to be separated is chosen from optical rotation, absorbance, emission of spectroscopic radiation, refractive index, density, conductivity, pH, and combinations thereof.

According to embodiments, the characteristic point is chosen from a local minimum of the history, a point of the history having a determined value, and a barycenter of two points of the history corresponding to values defined absolutely or relatively.

According to embodiments, the method further comprises the steps of:

the measurement of the purity and/or of the yield of at least one collected fraction chosen from the extract and the raffinate;

the comparison of the measured purity and/or the measured yield against a target purity and/or a target yield.

According to embodiments, the method comprises the steps of:

the measurement of the purity and/or of the yield of the raffinate and of the purity and/or of the yield of the extract;

the comparison of the measured purity and/or of the measured yield of each fraction against, respectively, a target purity and/or target yield.

According to embodiments, the method further comprises a step of modifying the volume of mixture to be separated that is injected per cycle as according to the difference between the measured purity(ies) and/or yield(s) and the target purity(ies) and/or yield(s).

According to embodiments, the method further comprises a step of modifying the volume of mobile phase injected per cycle according to the difference between the measured purity(ies) and/or yield(s) and the target purity(ies) and/or yield(s).

According to embodiments, the method further comprises a step of jointly modifying the volume of mixture injected per cycle and the volume of mobile phase injected per cycle according to the difference between the measured purity(ies) and/or yield(s) and the target purity(ies) and/or yield(s).

According to embodiments, the method further comprises a step of defining the target position as a function of the difference between the measured purity(ies) and/or yield(s) and the target purity(ies) and/or yield(s).

According to embodiments, the method further comprises:

the determination, in a node of the system, of the history of a variable that is representative of the concentration of one or more species contained in the mixture to be separated;

the detection on the history of another characteristic point located between the start of a step of collecting the raffinate and the end of the following step of collecting the extract;

the comparison of the position of the other characteristic point against a target position;

the adjustment of the volume carrying the other characteristic point, modifying the position of the other characteristic point to bring it closer to its target position.

According to embodiments, the injection of the mixture to be separated is a continuous flow.

According to embodiments, the method is a simulated moving bed method.

According to embodiments, the injection of the mixture to be separated is discontinuous.

According to embodiments, the method is a sequential simulated moving bed method.

According to embodiments, the mixture to be separated comprises one or more monosaccharides, preferably glucose and fructose, and the extract and the raffinate are enriched with different monosaccharides.

According to embodiments, the volume of the mobile phase injected per cycle is maintained greater than, or equal to, a minimum limit and/or less than, or equal to, a maximum limit, and the method comprises:

the determination, in a node of the system, of the history of a variable that is representative of the concentration of one or more species contained in the mixture to be separated;

the method being such that:

as long as the volume of the mobile phase injected per cycle is greater than, or equal to, said minimum limit, or less than, or equal to, said maximum limit, the method comprises:

the detection on the history of a first characteristic point between the start of the step of collecting the extract and the end of the following step of injecting the mobile phase;

the detection on the history of a second characteristic point between the start of the step of injecting the mobile phase and the end of the following step of collecting the raffinate;

the comparison of the position of each of the characteristic points against a respective target position;

the adjustment of the volume carrying the first characteristic point and the volume carrying the second characteristic point, modifying the position of the first characteristic point and the second characteristic point to bring them closer to their respective target positions;

when the volume of the mobile phase injected per cycle reaches the maximum or the minimum limit, the method comprises:

the detection on said history of a characteristic point between the start of a step of collecting the extract and the end of the following step of collecting the raffinate;

the comparison of the position of the characteristic point against a target position;

the adjustment of the volume carrying the characteristic point, modifying the position of the characteristic point to bring the position of the characteristic point closer to the target position.

The invention also relates to a computer program comprising program code instructions for executing the steps of the method as described above when said program is executed on a computer.

The invention also relates to a computer-readable storage medium on which a computer program as described above is recorded.

The invention also relates to a system comprising a processor coupled to a memory on which a computer program as described above is recorded.

The present invention enables to overcome the drawbacks of the prior art.

According to a first aspect, it is based on a regulation of a chromatographic separation system making it possible to optimize the operating parameters such as the flow rates or the periods, and having one or more advantageous properties among the following properties:

the method makes it possible to meet the requirements of purity and/or of yield of the fractions collected, the method makes it possible to adapt to variations in chromatographic conditions by supporting the inertias intrinsic to the chromatographic systems and/or by supporting potential analysis time delays, in particular in the analysis of purity and yield, the method makes it possible to satisfy constraints on the volume of the mobile phase injected, whether it is a maximum volume not to be exceeded, or a minimum volume to be respected.

The invention is based on:

the use of a characteristic point known as "of low concentration" located on the history of a representative variable between the start of a step of collecting the extract and the end of the following step of collecting the raffinate, the position of which is brought back to a target position by adjusting the volume carrying said characteristic point; in conjunction with the setting of a minimum limit and/or a maximum limit for the volume of mobile phase injected per cycle.

In document WO 2007/101944, two characteristic points of the history, respectively dedicated to adsorption and desorption, are controlled (see FIGS. 22 and 23 and the corresponding passage of the description). According to the invention, a single characteristic point is controlled in place of these two characteristic points. Compared to the teaching of document WO 2007/101944, this control of the position of a single characteristic point, defining less perfectly the position of the two adsorption and desorption fronts, makes it possible, in return, to control the amount of mobile phase injected during each cycle in a precise manner, and, in particular, to guarantee a controlled evolution between a maximum and/or minimum quantity of mobile phase injected.

According to a second aspect, the invention is based on a measurement of purity (and/or yield) of one or more collected fractions that does not require an offline collection device dedicated to the analysis of the purity of the collected fraction. It has one or more advantageous properties among the following: the method allows a fast and simple measurement of the purity of the collected fraction, the method offers savings in terms of cleaning, the method makes it possible to simplify the device required to perform purity measurements, and also makes it possible to increase the frequency of the measurements, since the steps of cyclical collections of a representative sample, of cleaning and preparation of the device, are eliminated.

This is accomplished through the use of at least one on-line detector and the determination of the histories of at least two variables that are representative of the concentration of at least two species contained in the mixture to be separated by means of this detector. A detector such as a spectrometer may be used to measure several representative variables. This purity measurement may be used for installation monitoring, or combined with the use of various control algorithms.

According to a third aspect, the invention is based on a measurement of purity (and/or of yield) of one or more collected fractions that does not require an offline collection device dedicated to the analysis of the purity of the collected fraction. The invention has one or more advantages among the following: the method is suitable for the use of slow detectors and may be implemented when the use of fast detectors is not possible, the method may be implemented in conventional installations in which a storage tank preceding another system such as a means of concentration, is present, the method does not require a device needing to be purged and cleaned between each purity analysis.

This is accomplished by measuring the concentrations of the species of the fraction collected in an intermediate tank present on the outlet line of the collected fraction. This purity measurement device may be used for installation monitoring, or combined with the use of different control algorithms.

In some embodiments, the first aspect of the invention is implemented in conjunction with the second aspect of the invention.

In some embodiments, the first aspect of the invention is implemented in conjunction with the third aspect of the invention.

BRIEF DESCRIPTION OF THE FIGURES

The following figures are obtained through accumulation chromatographic methods, and, more particularly, through SMB or SSMB methods.

FIGS. 5.A, 5.B and 5.C represent the concentration graphs (in g/L) of the species to be separated as a function of the ratio of feed volume to the installed resin volume (bed volume {BV}), obtained through a chromatographic simulation model in accordance with the Examples section below, with various injected quantities. The species monitored are a mixture of glucose polymers (DPn {degree of polymerization} greater than 1) (curve made up of diamonds), glucose (curve made up of squares), and fructose (curve made up of triangles). FIG. 5.A represents the concentration graph obtained during a loading pulse, FIG. 5.B represents the concentration graph obtained during saturation at high concentration, while FIG. 5.C represents the concentration graph obtained during saturation at low concentration.

FIGS. 6, 7, 8 show the evolution of the position of the measured characteristic points of desorption (FIG. 6), of adsorption (FIG. 7), of low concentration (FIG. 8), and the respective target position of each of these characteristic points (as a ratio of volume relative to the cycle volume, relative to the mean position of injection of the eluent), as a function of the number of cycles during the implementation of the methods described in Example 1. The position target of the characteristic point is represented by the symbol "o", the position of the characteristic point measured during the implementation of the controlled method using the two characteristic points of adsorption and desorption, but without constraint of eluent volume, is represented by the symbol "+", while the position of the characteristic point measured during the implementation of the method regulated using the characteristic point of low concentration and with a maximum eluent volume constraint is represented by the symbol "x".

DESCRIPTION OF EMBODIMENTS OF THE INVENTION

Figure 1:
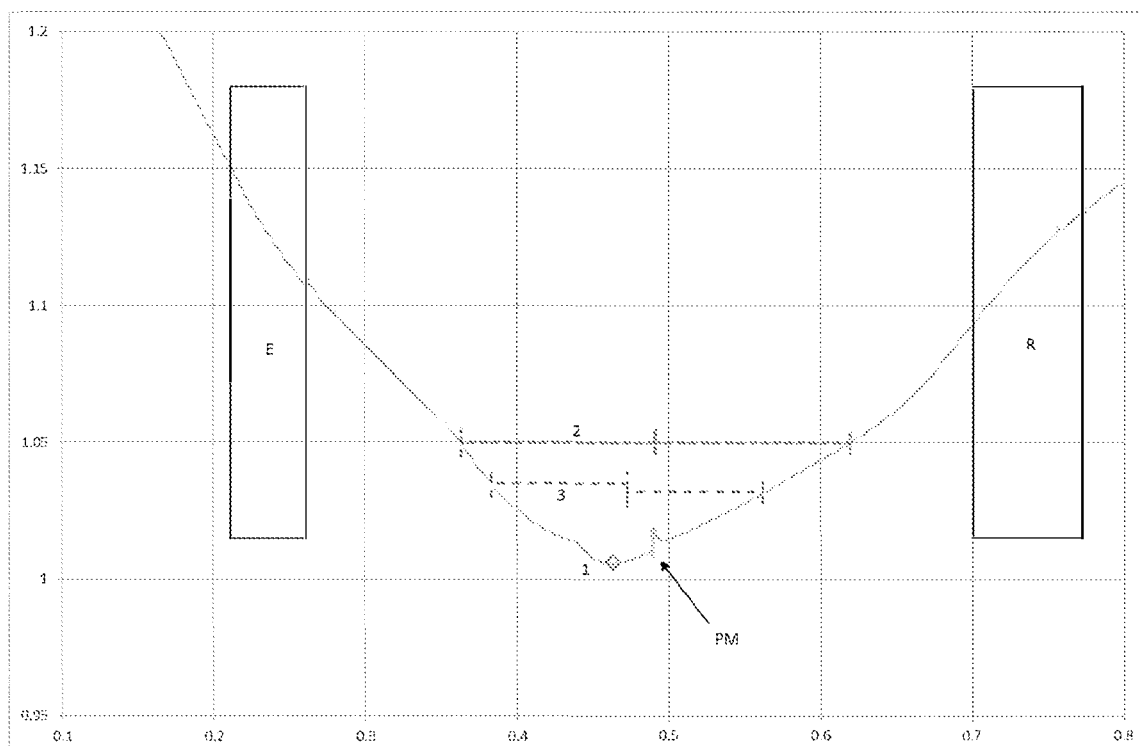
FIG. 1 represents a density history on which three examples of a characteristic point of low concentration are represented. The abscissa axis corresponds to a volume index representing the volume observed at the observation node compared to the total volume observed at the observation node over a cycle. The ordinate axis corresponds to density.

The invention is now described in more detail in a non-limiting manner in the description which follows.
General Presentation of the Chromatographic Separation Method The invention (in its three aspects) relates to a method for separating a mixture in a system comprising a set of several chromatography columns containing a stationary phase, wherein the method comprises successively, in a cyclic manner, in a given part of the system:
    a step of collecting a raffinate, a step of injecting the mixture to be separated, a step of collecting an extract and a step of injecting the mobile phase.

The different steps above follow one another in this part of the system. The part of the system in question is preferably located between the outlet of one column and the inlet of the next column. Alternatively, the part of the system in question may include a column or a column part.

At a given moment, one or more of the above steps may be simultaneously implemented in one or more parts of the system. For example, all of these steps may be implemented simultaneously in respective parts of the system.

By "mixture to be separated" is meant a mixture of species (or compounds, including, in particular, the molecules) containing at least two species, for example at least one species of interest and at least one impurity. The mixture to be separated may be binary when it is composed of two species, or complex when it is composed of more than two species. The mixture to be separated may be diluted in a liquid phase, preferably the mobile phase used in the chromatographic method.

According to embodiments, the mixture to be separated comprises one or more species chosen from:
    a monosaccharide sugar, for example glucose, fructose, deoxyribose, ribose, arabinose, xylose, lyxose, ribulose, xylulose, allose, altrose, galactose, gulose, idose, mannose, talose, psicose, sorbose or tagatose, and/or a polysaccharide sugar, for example a galactooligosaccharide, a fructo-oligosaccharide or a wood hydrolyzate, and/or proteins, and/or amino acids, and/or organic acids, such as citric acid, and/or mineral salts, and/or ionized species, and/or alcohols and/or glycols, and/or organic acids from natural or enzymatic or fermentation media.

This list is not exhaustive, the invention in its entirety may be carried out on any chemical species to be separated of whatever form.

In certain embodiments, the mixture to be separated comprises one or more monosaccharides. Preferably, the extract and the raffinate are enriched with different monosaccharides. Advantageously, the monosaccharide has 5 or 6 carbon atoms. Preferably, the monosaccharide is chosen from glucose, fructose, deoxyribose, ribose, arabinose, xylose, lyxose, ribulose, xylulose, allose, altrose, galactose, gulose, idose, mannose, talose, psicose, sorbose, tagatose, and a mixture thereof. In certain particularly advantageous embodiments, the mixture to be separated comprises glucose and fructose.

The method according to the first aspect of the invention is particularly advantageous in such a case, since the consumption of the eluent represents a significant cost in the separation of these monosaccharides.

In the present application, the terms "mixture to be separated", "feed", "mixture to be treated", "product to be purified" and "initial mixture" denote the same thing. The terms "mobile phase" and "eluent" are understood to mean the same thing in the present application.

By "raffinate" is meant a fraction enriched in species that are less retained by the stationary phase. In the case of an initial binary mixture, this is the fraction enriched with the least retained species.

By "extract" is meant a fraction enriched with species most retained by the stationary phase. In the case of an initial binary mixture, this is the fraction enriched with the most retained species.

The chromatographic columns are preferably arranged in series and in a closed loop, an outlet of a column being connected to the inlet of a following column, the outlet of the last column being connected to the inlet of the first column.

The columns may also be called chromatography "cells". They may be used in a carousel system, arranged one next to the other, or even arranged one above the other within one or two towers in order to limit the footprint.

The columns may contain a liquid or solid stationary phase. The eluent may be a fluid in the gaseous, liquid or even supercritical state. Injection lines for the mixture to be separated and for the eluent are provided at the inlet of the different columns, while lines for collecting extract and raffinate are provided at the outlet of the columns. Preferably the injection and collection lines are connected via connection lines between two successive columns.

In certain advantageous embodiments, the system also comprises members for sequencing the injection and collection lines. In particular, the sequencing of these injection and collection lines takes place over a system operating cycle. In the present application, an "operating cycle" or "cycle" designates the time at the end of which the injection and collection lines have been sequenced until they return to their initial position in the system. At the end of a cycle, the system is again in its initial configuration. A cycle generally has as many periods as there are columns in the separation loop. Thus the cycle of a method implemented on an 8 column system is composed of 8 periods.

The displacement of the collection lines (extract and raffinate) and the injection lines (loading and mobile phase) in the system is also called line switching in the present description.

We can generally define four areas in the system (in particular when the method implemented is an SMB method, as described below):

area 1 located between the eluent injection line and the line for collecting the extract, area 2 located between the line for collecting the extract and the line for injecting the mixture to be separated, area 3 located between the line for injecting the mixture to be separated and the line for collecting the raffinate, and area 4 located between line for collecting the raffinate and the eluent injection line.

The method according to the invention is advantageously a periodic chromatographic storage method.

By "accumulation method" is meant a chromatographic method in which the injection of the mixture to be separated is inserted or added to a non-zero concentration profile passing from the outlet to the inlet of a column.

Examples of such accumulation methods are the SMB method, the VariCol method, the Powerfeed method, the ModiCon method, the iSMB method or the SSMB method.

The simulated moving bed method (or SMB) is a continuous multi-column method, the injection of mixture to be separated being carried out over an entire cycle.

The SMB method may, in particular, be a SMB method with four areas. In this case, the system comprises a set of columns mounted in series and in a closed loop, the outlet of one column being connected to the inlet of the next column. The system comprises at least one line for injecting a mixture to be separated, a line for collecting a fraction enriched in species that is little retained by the stationary phase (the raffinate), a line for injecting an eluent and a line for collecting a fraction enriched in species that is more retained by the stationary phase (the extract). The injection lines (mixture to be separated and the eluent) and the fraction collection lines move periodically and synchronously (synchronous sequencing) within the loop in the direction of the flow of the fluid flowing through the loop. The duration between two displacements of all the injection and collection lines of a column corresponds to a period; at the end of a cycle all the points will have returned to their initial position, the system having a cyclic operation. A cycle has as many periods as there are columns.

The method according to the invention may be a method of continuous injection of the mixture to be separated (i.e. a method in which the injection of the mixture to be separated is a continuous flow). The injection of the mixture to be separated is then carried out throughout the duration of the cycle. The method according to the invention may also be a method of quasi-continuous injection of the mixture to be separated. In certain particularly advantageous embodiments, the method according to the invention is an SMB method, preferably an SMB method with four areas.

Alternatively, the method according to the invention may be a method in which the injection of the mixture to be separated is discontinuous. In these methods, the injection of the mixture to be separated is not carried out over the whole of a cycle but for a total duration lasting less than one cycle.

Mention may be made of a discontinuous injection separation method called the iSMB method (Improved Simulated Moving Bed), as described in documents EP 0342629 and U.S. Pat. No. 5,064,539. In this method, the system operates in one step in a closed loop, without injection or product collection. We may also cite the SSMB method (Sequential Simulated Moving Bed) whose sequential multi-column method is described, for example, in document WO 2015/104464. Preferably, the method according to the invention involving a discontinuous injection of mixture to be separated, is an SSMB method.

Regulation Method

The method according to the first aspect of the invention comprises:
- the determination, in a node of the system, of the history of a variable that is representative of the concentration of one or more species contained in the mixture to be separated;
- the detection on said history of a characteristic point between the start of a step of collecting the extract and the end of the following step of collecting the raffinate;
- the comparison of the position of the characteristic point against a target position;
- the adjustment of the volume carrying the characteristic point, modifying the position of the characteristic point to bring the position of the characteristic point closer to the target position;
- the volume of the mobile phase injected per cycle being maintained above a minimum limit and/or below a maximum limit.

By "system node" or "observation node" is meant a physical point of the chromatography system which may be freely chosen.

In some embodiments, the observation node is located between the outlet of one column and the inlet of the next column in the system.

We call "history", the state or evolution of a variable that is representative of the concentration of one or more species contained in the mixture to be separated in motion in the system, this state being considered for a determined duration or time at the observation node. Thus, we may measure the evolution of a variable that is representative of the concentration of one or more species contained in the mixture to be separated flowing at the observation node. A history may be represented:
- as an evolution as a function of time, for example without limitation expressed in gross time, or in time elapsed relative to the start of the cycle or reduced to the total cycle time;
- as an evolution as a function of the integration over time of a liquid flow, preferably the flow flowing at the observation node, for example in a non-limiting manner expressed in gross volume, or in volume flowed compared to the beginning of the cycle or reduced to another volume (volume of a column or total cycle volume), this method being particularly advantageous in the case where the flow rates are variable during the period or cycle;
- as a more general evolution of an indicator of progress in the cycle.

The history may thus be temporal, volumetric, or dependent on a setting the method cycle.

A history is different from a concentration profile. The concentration profile of the fractions of the fluid flowing in the system is called the "concentration profile", this state being considered at a given instant over the entire system.

The document FR 2699917, cited at the beginning of this description, describes steps making it possible to reconstitute a concentration profile.

The duration during which the state of the variable is determined, i.e. during which the history is determined, may be, for example, an operating cycle. At the end of the cycle, the history may be reset and restarted. The duration may also be shorter than an operating cycle.

As indicated above, the abscissa of a history may be expressed in a non-limiting way in different units:
- the gross time: the axis then starts from 0 and ends at the effective end of the cycle time;
- the reduced time, defined by the gross time divided by the cycle time: in this case, the history axis is always between 0 and 1;
- an index of progress in the cycle: this is the generalization of the gross time divided by the cycle time; this is interesting in the case where there are scheduled stops of elution rates, whose duration may be variable;
- a volume index corresponding to the volume observed at the system node divided by the total volume observed at the observation node.

In advantageous embodiments, the chromatographic system comprises a detector, and possibly a plurality of detectors, positioned at the node of the system where the history of the variable representative of the concentration of one or more species contained in the mixture to separate, is obtained.

The detector may be, for example, a densimeter, a polarimeter, a conductometer, a refractometer, an infrared, near infrared, Raman or UV/visible spectrometer, or an on-line nuclear magnetic resonance apparatus.

The detectors may be located on the system, namely on the lines of the system itself; in this case, we may consider that the fluid circulates through detectors. This is advantageous for low fluid flow rates in the system. For higher flow rates, it may be preferable to re-position the line detectors, wherein the detectors are placed on bypass lines.

The method according to the invention comprises a step of determining, at a node of the system, the history of a variable that is representative of the concentration of one or more species contained in the mixture to be separated. Thus, the state of a variable that is representative of the concentration of one or more species is determined by means of one or more detectors as described above.

This variable may be the concentration of one or more species of the mixture if the detectors allow it. In other embodiments, during this step, the variable representative of the concentration of one or more species is not the concentration itself nor the purity itself of the fractions. This has the advantage of regulating the operation more quickly than if a concentration or purity had to be measured (such a measurement may be complex and, therefore, take a long time). Furthermore, since it is not necessary to measure the purity or the concentration, it is not necessary to calibrate the detector, and the method according to the invention may thus tolerate a drift of the detector(s) used.

It is not necessary to physically produce a history, for example by viewing or printing the history. Direct regulation without recording or viewing may be sufficient. Preferably, the step of determining the history is carried out at a single node, which makes it possible to limit the use of detectors and to avoid having to consider the synchronization of the detectors, the synchronization also being able to evolve over time in the case, for example, of a change of state of one of the columns of the system.

The variables that are representative of the concentration of one or more species contained in the mixture to be separated are preferably variables that may be obtained quickly and directly, conversely, for example, to the concentration which often requires prior calibration.

Thus, as an example of a specific variable, we may cite:
- the optical rotation, obtained, for example, by the signal returned by a polarimetric detector, which is usable in the case where the species of the mixture to be separated are optically active, for example enantiomers;
- absorbance or emission of spectroscopic radiation, obtained, for example, by the signal returned by a spectroscopic detector, for example with UV/visible or infrared radiation, which is usable when the species of the mixture to be separated are natural or synthetic molecules having detectable chemical groups, in particular biomolecules such as proteins or peptides;
- the refractive index, the density, the conductivity or the pH, which are obtained, for example, by the signal returned by detectors measuring such physical quantities, and which are usable, for example, in the case where the mixture to be separated contains sugars, ionic species, acids or bases;
- the combination of several specific variables mentioned above,
- one or more variables obtained from other detectors.

The variables representative of the concentration given above by way of example, are variables for which a history may be easily obtained. The histories of these variables may be obtained in real time, which makes the method efficient. The histories translate the evolution of the concentrations at the observation node, wherein this is in the form of a signal which may easily be obtained through monitoring by a detector.

The separation method according to the invention also comprises a step of detecting a characteristic point on the history, called "characteristic point of low concentration" in the present description. This step makes it possible, from the determination of the variable that is representative of the concentration, to define a revealing point of the separation method. According to certain embodiments, the characteristic point is not a precise value of the variable but is indicative of a circulation phenomenon at the observation node. The characteristic point is indicative of a relative behavior of the species circulating at the observation node.

The observation node is positioned at the outlet of a column of the system. During the cycle, the lines (for collecting the raffinate, injecting the mixture to be separated, collecting the extract, and injecting the mobile phase) and the areas, move from one column to another and the said lines and areas are therefore next to (or in the vicinity of) the observation node at specific times, i.e. between the same successive columns as the observation node. On the history, it is possible to define times and durations corresponding to the passage of the lines (collection of the raffinate, injection of the mixture to be separated, collection of the extract, and injection of the mobile phase) in the vicinity of the observation node. It is then possible to locate on the history, the intervals or the mean points of the positions (also called mean positions) for collecting the raffinate, injecting the mixture to be separated, collecting the extract, and injecting the mobile phase, as well as the areas that these intervals and mean points determine.

According to the invention, the characteristic point of low concentration is located between the start of a step of collecting the extract and the end of the following step of collecting the raffinate.

Preferably, on the history, the said start of the extract collecting step and the said end of the following raffinate collecting step flank a mobile phase injection step. In the case of a four-area method, as described above, the characteristic point of low concentration is located either in area 1, or in area 4, or at the interface between these two areas (i.e. at the instant corresponding to the characteristic point, the observation node is located either in area 1 of the system, or in area 4, or at the interface between these two areas, i.e. the mean eluent injection position).

In embodiments, the detection of the characteristic point on the history takes place between the end of a step of collecting the extract and the start of the following step of collecting the raffinate.

In embodiments, the detection of the characteristic point takes place in a portion of the history in which the density and/or the total concentration of the species is less than or equal to 25% of the density or, respectively, of the maximum total concentration of the mixture to be separated. The detection of the characteristic point of low concentration corresponds to the detection of the global position of the set formed by the adsorption front and the desorption front on the history, while in the document WO 2007/101944, the positions of the two fronts are individually detected and used to control the positions of the adsorption and desorption fronts.

By "adsorption front" is meant an increase in concentration observed at the column outlet, in particular when the concentration increases from a low value to a value close to the maximum concentration detected over a cycle. The concentration may be the concentration of one species of the mixture to be separated, or the concentration of all the species present.

By "desorption front" is meant a decrease in concentration observed at the column outlet, in particular when the concentration decreases to a low value from a value close to the maximum concentration detected on a cycle. The concentration may be the concentration of one species of the mixture to be separated, or the concentration of all the species present. The characteristic point of low concentration may be, for example:
- the minimum of the history, i.e. the minimum signal point as detected between the collection of the extract and the collection of the raffinate, or a local minimum; this point may be measured by a minimum signal from a densimeter, from a UV detector, but also by the minimum of the absolute value of the signal from a polarimeter;
- the point in the history having a determined value, for example the value zero, in particular when the variable that is representative of the concentration is the optical rotation, and the species to be separated have optical rotations of opposite signs;
- a point calculated as an intermediary between two points corresponding to predetermined values on the history; the predetermined values possibly corresponding, for example, to a threshold of the signal from a densimeter or a UV detector, but also to a threshold of the absolute value of the signal from a polarimeter; the characteristic point may be, for example, a barycenter and, in particular, the iso-barycenter (temporal or volumetric) of two points in the history corresponding to predetermined values;
- a point calculated as an intermediary between two points corresponding to values defined relatively on the history; these values may, in particular, correspond to respective fractions of the values reached in local maxima or minima of the history; thus the characteristic point may be a barycenter and, in particular, the iso-barycenter (temporal or volumetric) between two points corresponding to such defined values, and, in particular, between two points which are a characteristic point of the adsorption front and a characteristic point of the front desorption respectively; the advantage of this method is that these two characteristic points may be calculated according to two different detectors.

Figure 2:
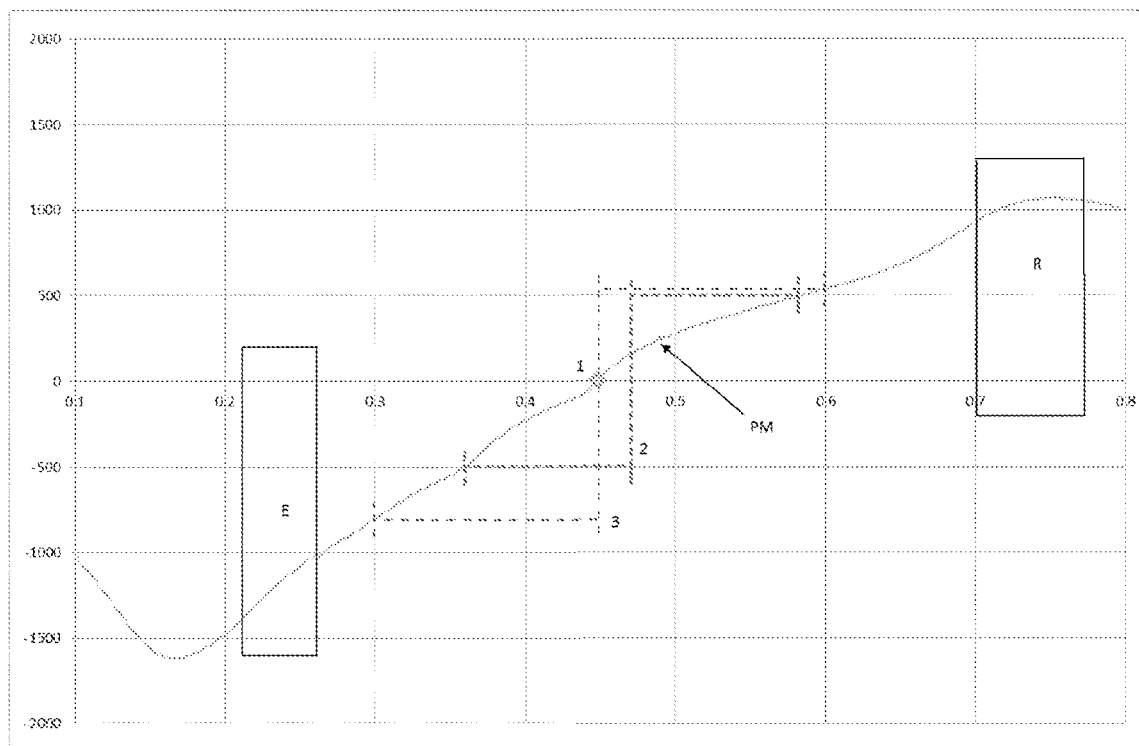
FIG. 2 represents a history of optical rotation on which three examples of a characteristic point of low concentration are represented. The abscissa axis corresponds to a volume index representing the volume observed at the observation node compared to the total volume observed at the observation node over a cycle. The ordinate axis corresponds to the polarity.

FIGS. 1 and 2 show examples of a characteristic point of low concentration detected from a history. FIG. 1 corresponds to a density history (black line), obtained by a densimeter, between the collection of the extract (denoted E) and that of the raffinate (denoted R). Three examples of characteristic points of low concentration are presented. A first example of a characteristic point of low concentration, denoted 1, is the point corresponding to the minimum density. A second example is the point denoted 2, the abscissa of which is the iso-barycenter of the abscissas of the two points of the history corresponding to a predetermined density value of 1.05. A third example is point 3 whose abscissa is the iso-barycenter of the abscissas of two points obtained by threshold relative to 20%: the first point is defined by the abscissa such that the density is 20% between the minimum density observed and the density measured at the start of extract collection; the second point is defined reciprocally by the abscissa such that the density is 20% between the minimum density observed and the density measured at the end of the raffinate collection. The mean position of the mobile phase injection is denoted PM.

FIG. 2 corresponds to a history of optical rotation, obtained by a polarimeter, between the collection of the extract (denoted E) and that of the raffinate (denoted R). Three examples of characteristic points of low concentration are presented. A first example of a characteristic point of low concentration is the point denoted 1 where the measured optical rotation is zero. A second example is the point denoted 2 whose abscissa is the iso-barycenter of the abscissas of the two points corresponding to a threshold value of the absolute value of optical rotation. A third example is the point denoted 3 whose abscissa is the iso-barycenter of the abscissas of the point corresponding to an optical rotation equal to 50% of the maximum optical rotation, and of the point corresponding to an optical rotation equal to 50% of the minimum optical rotation. The position of the injection of the mobile phase is denoted PM.

The position of the characteristic point is data making it possible to stabilize the purities and yields of the system.

As indicated above, an advantage of the method according to the invention is that the history may be determined over a duration less than one cycle. In fact, it suffices to detect the characteristic point and then proceed to the next step of regulation. Preferably, however, the determination step is carried out over a complete cycle. Furthermore, the steps of determining the history and of detecting the characteristic point may be implemented at a frequency corresponding to an integer number of cycles (all the n cycles, n being greater than or equal to 1). The more frequently are the steps of determining the history and of detecting the characteristic point, the more precise is the adjustment of the operation of the system.

The method according to the invention also comprises a step of comparing the position of the characteristic point with a target position.

The detection of the characteristic point may be assimilated to the determination of the time (or of the elapsed volume, the latter corresponding to the integration of the flow over time), wherein the characteristic point appears at the observation node for the duration of the history, for example a cycle; the target position then corresponds to the time (or volume) when the characteristic point should appear at the observation node to allow operation under the desired conditions.

On a history corresponding to the evolution over time of a variable that is representative of the concentration of one or more species contained in the mixture to be separated, the step of comparing the position of the characteristic point with a target position, consists in comparing the abscissa of the characteristic point with a predetermined target abscissa.

This helps to determine whether a disturbance has occurred in the system. In a suitably adjusted system, preferably without disturbance and in steady state, the position of the characteristic point coincides with the target position. If the system is not disturbed, the characteristic point appears at an observation node at approximately the same time during each cycle. The difference between the position of the characteristic point and the target position may then correspond to a difference in time of passage to the observation node.

The target position of the characteristic point of low concentration may be defined absolutely in the cycle, or else relative to the step of injection of the mobile phase, and/or relatively to a step of collection of fraction, raffinate and/or extract.

The method according to the invention also comprises a step of adjusting the volume carrying the characteristic point, modifying the position of the characteristic point to bring the position of the characteristic point closer to the target position, if there exists a difference between the position of the characteristic point and the target position. In other words, a difference between the position of the characteristic point and the target position corresponds to a deviation or a disturbance in the functioning of the system, which may be compensated by adjusting only the volume carrying the characteristic point.

By "volume carrying a concentration front" is meant in the present invention, the volume carrying a front on which the characteristic point is located, or in the vicinity of which the characteristic point is located.

In a four-area method as described above, it may be the carrying volume of area 1 (or desorption area), or the carrying volume of area 4 (or adsorption area). By "carrying volume of an area" is meant the volume circulating in the area in question between two line switching operations. This volume is the product of the flow of fluid circulating in the area and the period, while it may also be the integration over time of the flow between two line switching operations when the flow is not constant during the period. When the mobile phase volume of area 1 is modified, the position of the desorption front present in area 1 is also modified. Likewise, the volume of area 4 carries the adsorption front and a modification of the volume of area 4 will modify the position of the adsorption front.

By "volume carrying the characteristic point" is meant in the present invention a volume whose variation modifies the position of the characteristic point. As may be seen in FIGS. 1 and 2, a modification of the volume of area 1 will change the position of the front between the start of the collection of the extract and the mean eluent injection point, and will modify the position of the characteristic point of the desorption front. Conversely, a modification of the volume of area 4 will change the position of the front between the mean eluent injection point and the end of the collection of the raffinate, thus modifying the position of the characteristic point of the adsorption front.

A modification of the volume carrying the characteristic point may be performed by modifying one or more injection and/or collection flow rates; and/or by modifying the duration between line switching operations; and/or by modifying the duration of one or more injections and/or collections. Preferably, the modification of the volume carrying the characteristic point is carried out by modifying one or more injection and/or collection flow rates, or the duration between the line switching operations.

To modify the volume carrying the characteristic point, one may, for example, modify the flow in area 1 or the flow in area 4. The flow will, for example, be increased if the position of the characteristic point is located downstream of the target position (i.e. if the abscissa of the characteristic point is located downstream of the predetermined abscissa as the target position) or decreased if the position of the characteristic point is located upstream of the target position.

Preferably, the volume carrying the characteristic point is adjusted without the mobile phase injection volume being modified. The volume of mobile phase injected per cycle may then remain constant during the use of the method. This is particularly useful when a mobile phase volume constraint is set. Thus, when the volume of mobile phase injected per cycle reaches the fixed extreme limit (whether it is a minimum or maximum limit), this volume remains constant at this limit. The modification of the volume carrying the adsorption area (area 4), for example by a modification of the flow rate of the raffinate collection, then amounts to accordingly modifying the volume carrying the desorption area (area 1), and vice versa.

Thus, the adjustment of the volume carrying the characteristic point makes it possible to vary the passage of the species in the area whose carrying volume is modified. The characteristic point may be ahead of the target point (i.e. the point whose abscissa is the target position). By decreasing the volume carrying the characteristic point, we can slow down the circulation of species, and thus delay the characteristic point so as to bring it closer to the target point. Conversely, if the characteristic point is delayed with respect to the target point, the volume carrying the characteristic point is increased to accelerate the circulation of the species, and to accelerate the characteristic point so as to bring it closer to the target point. If the characteristic point is stabilized at the target point, this means that there is no adjustment to be made. It is also possible to consider providing a threshold of difference between the position of the characteristic point and the target position, wherein the adjustment is then made if the observed difference exceeds the threshold.

A regulation as described above, may, for example, be a PID control (Proportional, Integral, Derivative control) acting on the volume carrying the characteristic point.

In a four-area method, it is necessary to distinguish the terms "carrying volume of an area" (also called "volume of an area" or "volume of mobile phase of an area"), "volume of mobile phase" and "volume of mobile phase injected".

Thus (and as explained above), the volume of area 1 corresponds to the volume of the mobile phase which passes the column(s) specific to area 1 over a given period, and located between the eluent injection line and the extract collection line. Similarly, we may define a volume for each area of the system (for area 2, for area 3 and for area 4). As indicated above, the modification of an area volume is preferably carried out either by a modification of the flow rate, or by a modification of the duration between two switchings of the lines which frame the said area. This can modify the volume of mobile phase injected, or the volume of mobile phase of the collections. For example, a variation in the volume of area 4 while keeping the volumes of area 3 and area 1 constant, is equivalent to a variation of the volume of collection of the raffinate and of the volume of the mobile phase injected.

The term "mobile phase volume" is a generic term for the mobile phase passing through a column.

On the other hand, the "volume of mobile phase injected" or "volume of mobile phase injected per cycle" corresponds to the volume of fresh eluent injected between area 4 and area 1 (in a four-area method). It is this volume that the invention is intended to control.

The regulation method described in document WO 2007/101944 makes it possible to individually regulate the mobile phase volumes of areas 1 and 4, which are the volumes carrying the characteristic points of areas 1 and 4 (characteristic points of desorption and adsorption). This does not allow precise control of the volume of mobile phase injected per cycle.

In the method according to the invention, when a volume constraint of the mobile phase injected per cycle is encountered (i.e. when a maximum and/or minimum limit is reached), the regulation is carried out by providing the same correction to the volume of area 1 and to the volume of area 4 (when the method is a four-area method). The regulation thus relates to a quantity called "volume carrying the point of low concentration" which may be, in the case of a method with four areas, the volume of area 1, or the volume of area 4, or a combination of the two. In such a case, a variation made to the volume of area 1 and area 4 will modify the volume of collection of the raffinate and/or of the extract, but not the volume of the mobile phase injected.

The advantage of the method according to the invention is that it makes it possible both to react quickly to disturbances in the system and to control the amount of mobile phase injected during each operating cycle, unlike the methods described in the prior art. In general, methods based on the analysis of the composition of collected fractions do not allow rapid reaction to disturbances whose effects may take several cycles to stabilize. In addition, in certain cases, the time taken to analyze and obtain purity values is long. The time taken to analyze the compositions is all the longer as it is preferable to sample the fractions of the chromatographic system over an entire cycle, wherein these samples are then analyzed. Thus, the purity results may only be obtained with at least one delay cycle and with a periodicity greater than one or two cycles, which makes regulation and determining the adjustment to be applied more difficult. There is, therefore, a delay in reactivity of the accumulation systems following modifications to operating parameters or following disturbances to which an analysis delay may be added.

The present method makes it possible to react as soon as a change in history is observed. The regulation implemented to restore the system is then rapid. In addition, the method according to the invention also makes it possible, by controlling a characteristic point between the start of a step of collecting the extract and the end of the following step of collecting the raffinate, to control the volume of the mobile phase used by the chromatographic method, unlike the methods regulated by the control of two characteristic points located on the adsorption front and on the desorption front.

Figure 3:
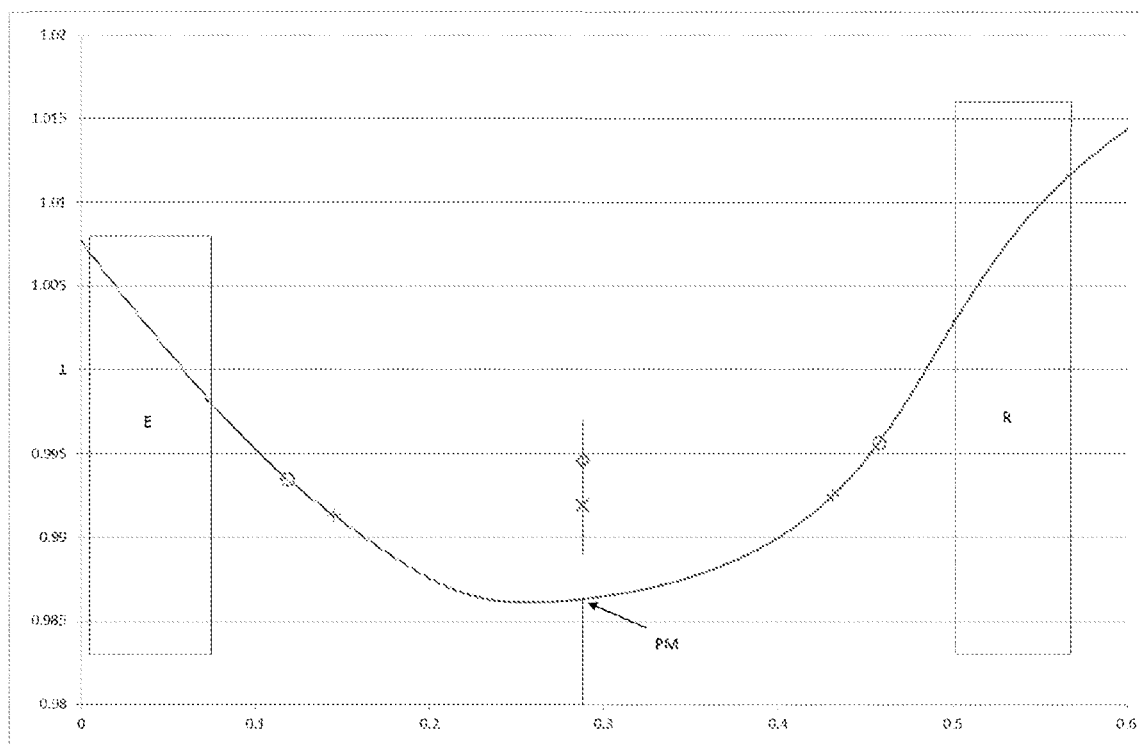
FIGS. 3 and 4 show a density history obtained during the implementation of a method according to the invention, wherein a constraint of maximum eluent volume (FIG. 3) or minimum eluent volume (FIG. 4) was imposed. On this history are represented the position of the eluent injection (PM), the characteristic point of adsorption (symbol "0" on the right part of the figure), its target position (symbol "+" on the right part of the figure), the characteristic point of desorption (symbol "0" on the left part of the figure), its target position (symbol "+" on the left part of the figure), the characteristic point of low concentration (symbol "0") and its target position (symbol "x"). The abscissa axis corresponds to the ratio of volume observed at the observation node to the total volume observed at the observation node over a cycle. The ordinate axis corresponds to density. The collection of the extract is denoted E, the collection of the raffinate is denoted R.

FIG. 3 shows a history obtained during the use of a method according to the invention in which a constraint of maximum volume of eluent injected per cycle has been set.

The position of the characteristic point of low concentration coincides with its target position. In this example, the position of the characteristic point of low concentration corresponds to the position of the eluent injection. Note that the characteristic adsorption and desorption points (as described in document WO 2007/101944) have not reached their target position and that gaps persist between the adsorption and desorption points and their respective target positions.

Figure 4:
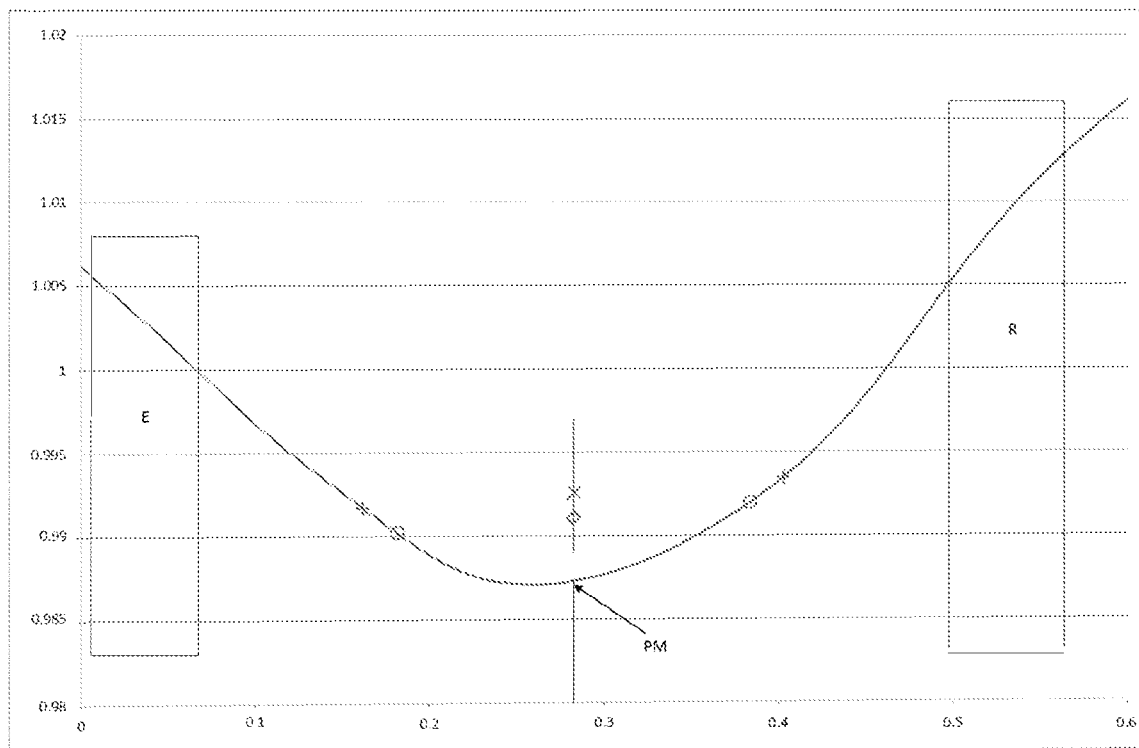
Figure 7:
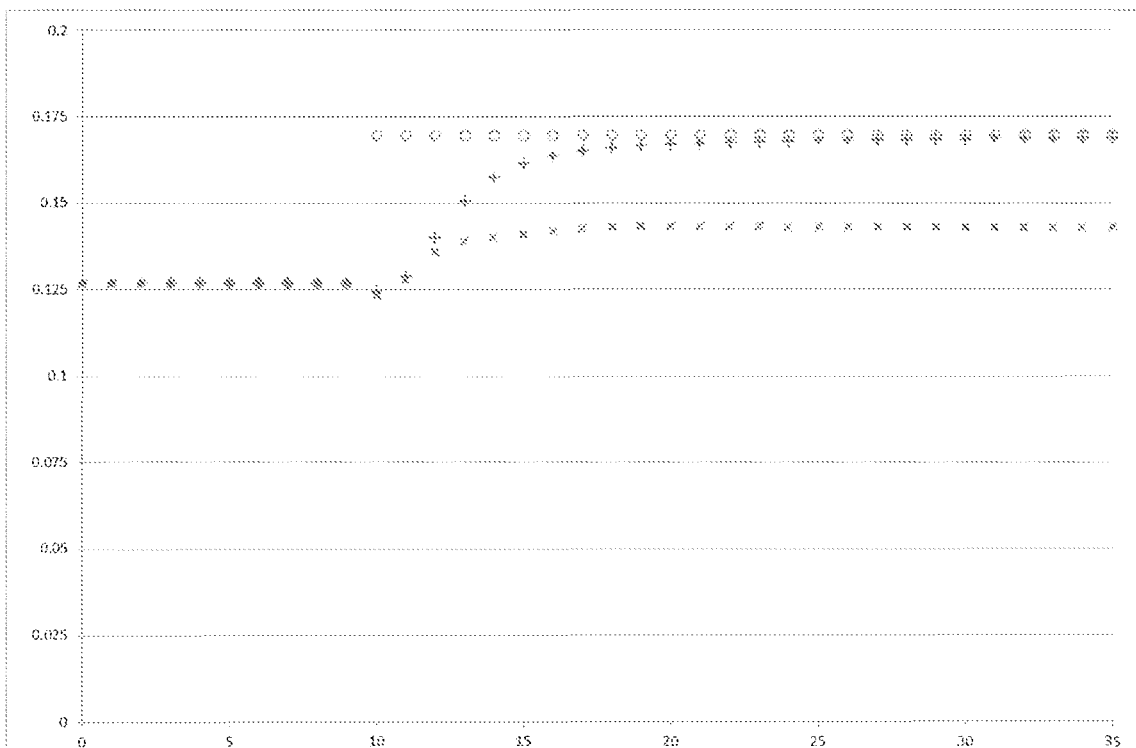
Figure 8:
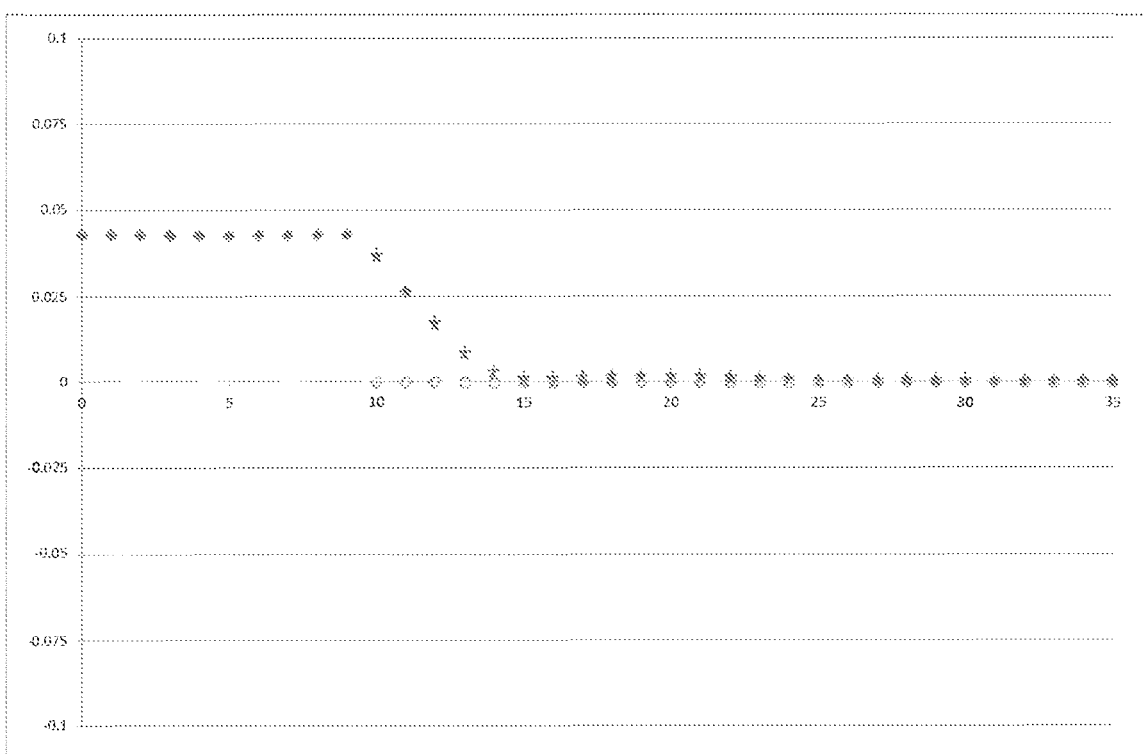
Figure 9:
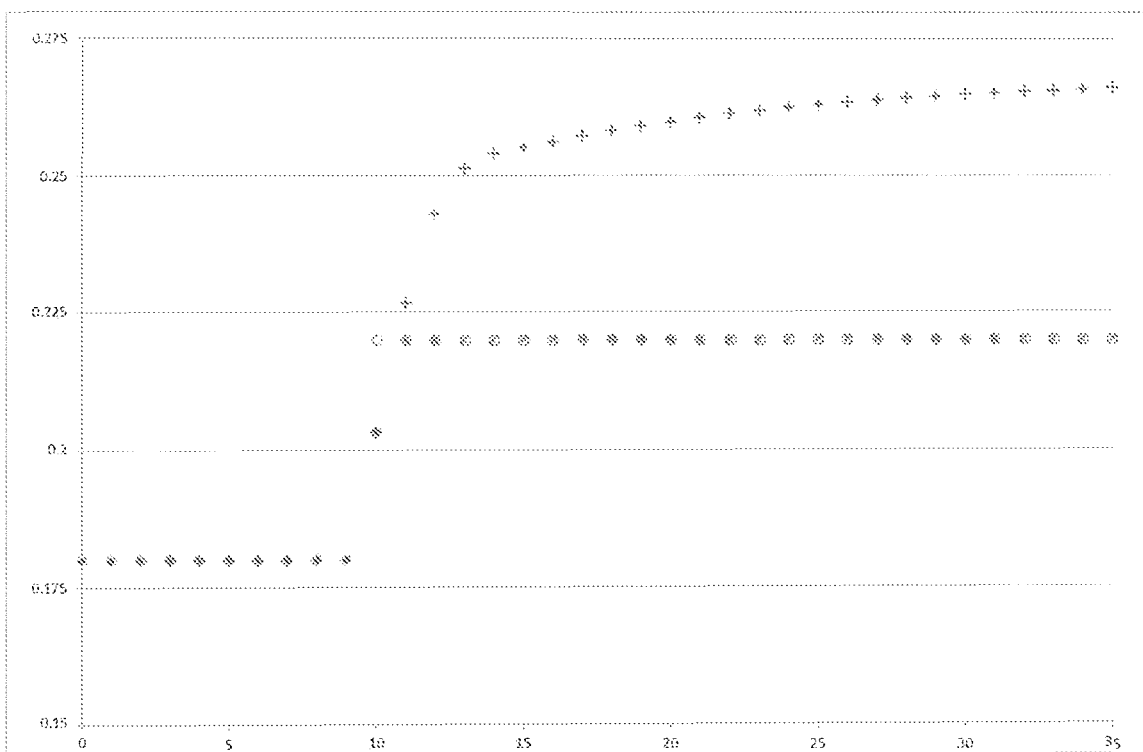
FIGS. 9 and 13 represent the consumption of eluent per cycle (bed volume {BV}) as a function of the number of cycles during the implementation of the methods described in Examples 1 and 2. The value of the constraint of the imposed maximum eluent volume (FIG. 9) or minimum eluent volume (FIG. 13), is represented by the symbol "o", the actual eluent consumption per cycle during the implementation of the regulated method using the two characteristic points of adsorption and desorption and without constraint of eluent volume is represented by the symbol "+", while the actual consumption of eluent per cycle during the implementation of the method regulated using the characteristic point of low concentration and with an eluent volume constraint, is represented by the symbol "x".
Figure 10:
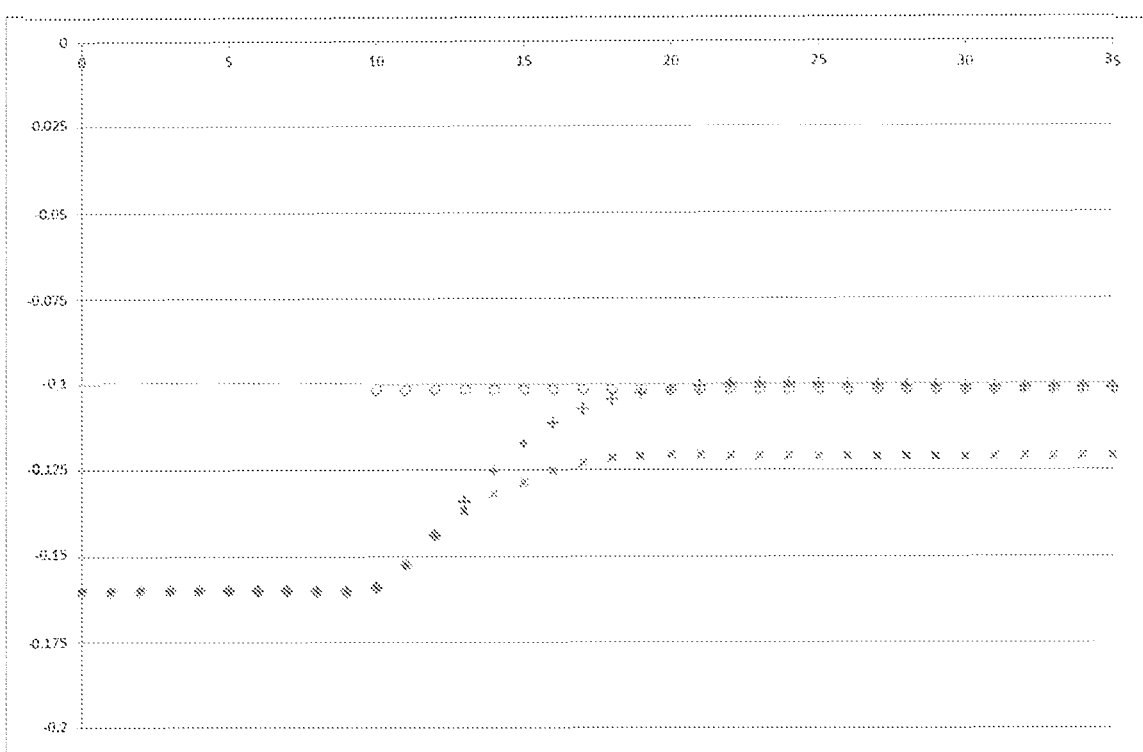
FIGS. 10, 11 and 12 present the same data (represented in the same way) as FIGS. 6, 7 and 8, but obtained during the implementation of the methods described in Example 2, the symbol "x" representing the position of the characteristic point measured during the implementation of a method regulated using the characteristic point of low concentration, and with a minimum eluent volume constraint.
Figure 11:
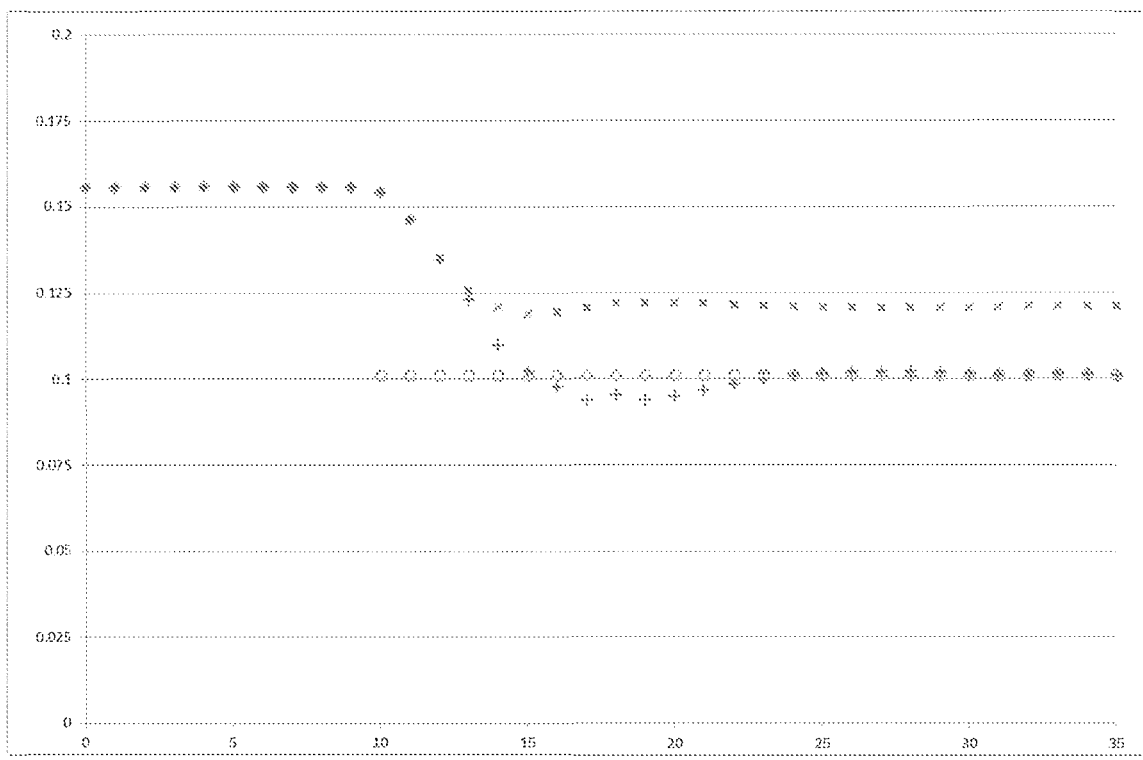
Figure 12:
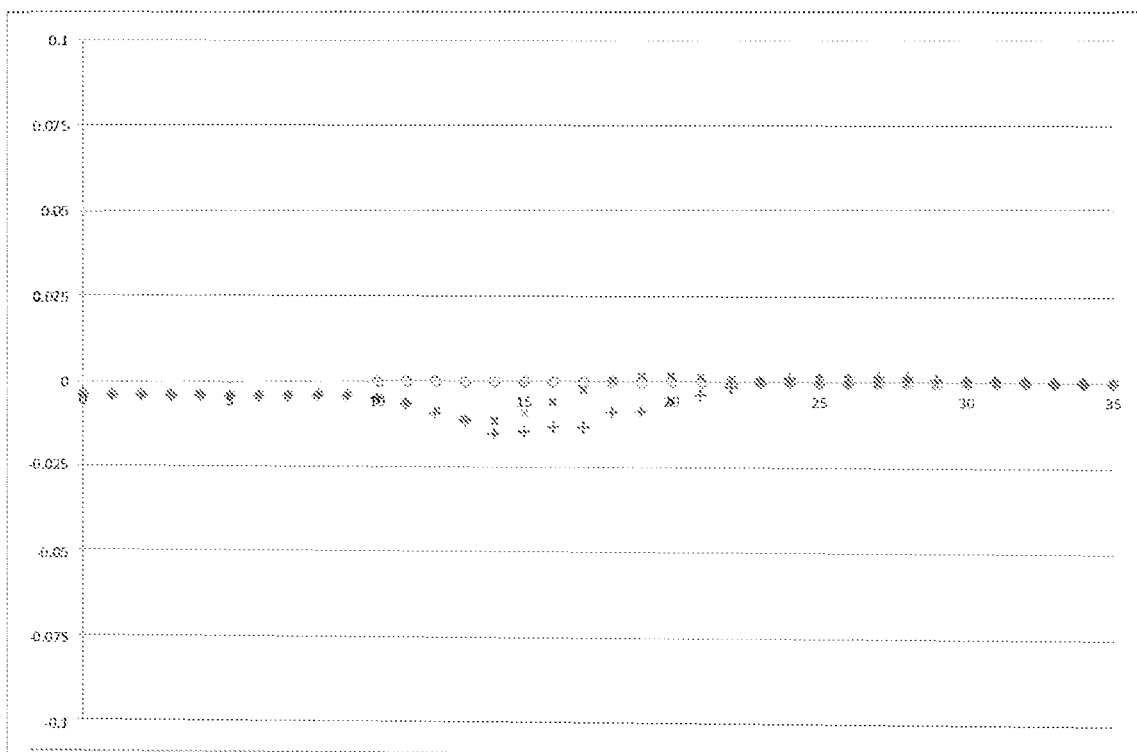
Figure 13:
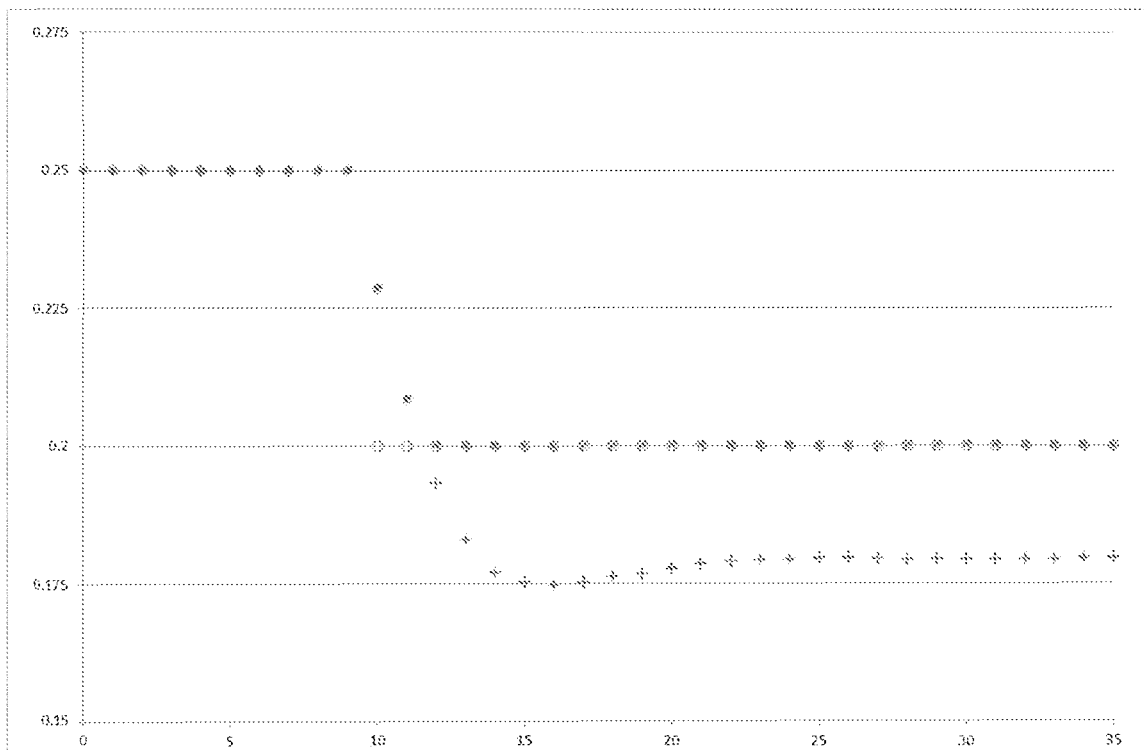

FIG. 4 shows a history obtained during the use of a method according to the invention in which a constraint of minimum volume of eluent injected per cycle has been set. The position of the characteristic point of low concentration coincides with its target position. In this example also, the position of the characteristic point of low concentration corresponds to the position of the eluent injection. It is to be noted that, in this case also, the characteristic points of adsorption and desorption have not reached their target position and that gaps persist between the adsorption and desorption points and their respective target positions.

This regulation on the basis of the characteristic point of low concentration and not of the characteristic points of adsorption and desorption allows the imposed limits of eluent volume to be respected.

According to certain embodiments, the method further comprises a step of measuring the purity of at least one collected fraction. In particular, the method comprises a step of measuring the purity of the extract and/or of the raffinate.

The purity of the fraction(s) is then compared respectively with a target purity, i.e. with a predetermined purity which it is desired to achieve.

It is also possible, as an alternative to measuring the purity(ies) or as a complement to these measurements, to measure a quantity of a target species in a collected fraction and determine its yield linked to the presence of target species in the fraction(s) collected. Thus, the method according to the invention may comprise a step of measuring the yield in a target species of the extract and/or of the raffinate, and a step of respectively comparing the measured yield(s) with a target yield. In the present invention, it is possible to use either purity and/or yield constraints; it is, in fact, the same type of constraints, but imposed differently.

By "yield of a collected fraction" is meant in the present invention the yield of a target species contained in said collected fraction.

In certain embodiments, the method according to the invention also comprises a step of modifying the volume of mixture to be separated, which is injected per cycle according to the difference between the measured purity(ies) and the target purity(ies).

For example, in the case of a binary mixture, if the two purities of the extract and of the raffinate are both greater than the predetermined purities, this means that the purities are beyond specifications; the quantity of mixture may be increased to "degrade" the purities to specifications. If the extract and raffinate purities are both lower than the predetermined purities, this means that the purities are below specifications; the amount of mixture may be decreased to improve separation, and to increase purities to specifications. This operating mode may be adjusted when a single purity is of interest. As indicated above, it is also possible to measure a quantity of the target species and its yield linked to the presence of target species lost in the other collections. This yield is directly linked to the purity of the other fractions.

Preferably, the steps of measuring the purity (and/or yield) of at least one collected fraction, of comparing the measured purity(ies) (and/or the measured yield(s)) against a target purity (and/or a target yield), and modification of the volume of mixture to be separated injected per cycle, are performed at least in part, in parallel with the steps of detection on the history of the characteristic point of low concentration, of comparison of its position with a target position, and adjustment of the volume carrying the characteristic point.

The modification of the quantity of mixture to be separated may be implemented by modifying the volume of mixture injected during a period. The modification of the volume of mixture to be separated may be carried out in several ways:

by increasing or decreasing the mixture injection rate; and/or by increasing or decreasing the period duration.

Controlling the quantity of mixture (or load) to be separated that is to be injected requires measuring at least one data item relating to purity and/or yield. The following example, which is non-limiting, illustrates a method for defining the quantity of load to be injected, and which may be used if two purities are targeted for the extract and the raffinate. Let the following variables be:

$P^*_{ext}$: Target purity in the extract;

$p^*_{raff}$: Target purity in the raffinate;

$P_{ext}$: Purity measured in the extract;

$P_{raff}$: Purity measured in the raffinate;

$\varepsilon_{ext} = P_{ext} - P^*_{ext}$, i.e. the difference between the measured purity and the target purity of the extract $\varepsilon_{raff} = P_{raff} - P^*_{raff}$, i.e. the difference between the measured purity and the target purity of the raffinate.

The purities may be calculated by determining the mass or molar concentrations of one or more species of interest in the fraction concerned.

According to a first method, PID control may be performed on a quantity obtained from the deviations of one or more purities from their target value ($\varepsilon_{ext}$ and/or $\varepsilon_{raff}$). Another possibility is to use the value of a function depending on the purities obtained and the target purities in order to calculate the new quantity to be injected.

The modification of the quantity of mixture to be separated that is injected causes a disturbance which may cause the characteristic point of low concentration to move relative to the target position. The position of the characteristic point of low concentration is then modified by the adjustment of the volume carrying the characteristic point as has already been described above.

In the present invention, the regulation of the position of the characteristic point of low concentration is carried out by the control of a single carrying volume chosen from the volume of area 1, the volume of area 4, or a combination of the two (for example the mean of the characteristic points of each area). The distribution of the volume carrying between area 1 and area 4 remains precisely controlled, which makes it possible to respect high and/or low threshold values of the mobile phase volume. If the high and low thresholds are equal, the volume of mobile phase injected per cycle is regulated to a precise set value according to the invention. This setpoint naturally lies between the maximum and minimum mobile phase volume limits. The control method according to the invention, therefore, makes it possible to impose the non-crossing of high and/or low threshold(s), and also to precisely control the volume of mobile phase according to other criteria than the respect of the positions of the fronts in areas 1 and 4.

In a more general description of the invention, it is possible to control the volume of the mobile phase between maximum and minimum limits which are the extremes that are never to be exceeded by using intermediate control variables which are high and low thresholds. Two extreme ways of use are possible:

the high and low thresholds are fixed as being close to the maximum and minimum limits, while the mobile phase volume is controlled according to the invention when its excess value passes outside the authorized range;

the high and low thresholds are modified according to the purity and/or yield measurements, while the values of the thresholds themselves remain constantly between the maximum and minimum limits of the mobile phase volume.

Thus, in certain embodiments, the method according to the invention comprises a step of modifying the setpoint of the mobile phase volume injected per cycle according to the difference between the measured purity(ies) and the target purity(ies) (and/or the difference between the measured yield(s) and the target yield(s).

For example, in the case of a binary mixture, if the two purities of the extract and of the raffinate are both greater than the predetermined purities, this means that the purities are beyond the specifications; the mobile phase volume may thus be decreased. If the extract and raffinate purities are both lower than the predetermined purities, this means that the purities are below specifications; the mobile phase volume may be increased. This operating mode may be adjusted when a single purity is of interest. We can also measure a quantity of the target product and its yield linked to the presence of target product lost in other collections. This yield is directly linked to the purity of the other fractions.

Preferably, the steps of measuring the purity (and/or the yield) of at least one collected fraction, of comparing the measured purity(ies) (and/or the measured yield(s)) with a target purity (and/or with a target yield), and modification of the volume of mobile phase injected per cycle, are performed, at least in part, in parallel with the steps of detection on the history of the characteristic point of the low concentration, of comparison of its position with a target position, and adjustment of the volume carrying the characteristic point.

In certain embodiments, during the step of modifying the volume of mobile phase injected per cycle, the volume of mixture to be separated and injected per cycle remains constant.

According to other embodiments, the volume of mixture injected per cycle and the volume of mobile phase injected per cycle, are modified jointly according to the difference between the measured purities and the target purities (and/or the difference between the measured yields and the target yield(s).

The possible variation of the volume of mobile phase injected is performed taking into account the maximum limit and/or the minimum limit for this volume which are/is provided for in the method of the invention.

In some embodiments, the method includes a step defining the target position of the characteristic low concentration point according to of the difference between the measured purity(ies) and the target purity(ies) (and/or the difference between the measured yield(s) and the target yield(s)). This step makes it possible to improve the method already described, so as to optimize the target position relative to the desired purities. The purities measured may be the purity of the extract and/or of the raffinate.

Preferably, the steps of measuring the purity (and/or the yield) of at least one collected fraction, of comparing the measured purity(ies) (and/or the measured yield(s)) with a target purity (and/or with a target yield), and definition of the target position are performed at least in part in parallel with the steps of detection on the history of the characteristic point of low concentration, comparison of its position with a target position, and adjustment of the volume carrying the characteristic point.

The target position of the characteristic point of low concentration may be such that it is sufficiently distant (over time) from the raffinate and extract collections, if the purity of the two fractions (in the case of binary mixing) is of importance. For example, the characteristic point of low concentration may be positioned in the eluent injection step.

However, the purity of a single fraction may be important. In this case, the target position may be compared to one or other of the raffinate or extract collections. For example, the characteristic point of low concentration may be positioned in area 1 or in area 4.

As indicated above, it is also possible to measure an amount of the target product and its yield linked to the presence of target product lost in the other collections. This yield is directly linked to the purity of the other fractions.

It should be noted that the measurement of the purity of the fractions may be obtained with a certain delay. However, this does not penalize the method because the steps of measuring the purity of at least one collected fraction, of comparing the purity(ies) measured with a target purity, and of defining the target position, are advantageously performed in parallel with the steps of detecting the history of the characteristic point of low concentration, comparing its position against a target position, and adjusting the volume carrying the characteristic point. The definition of the new target position may then be implemented with each new measurement, or even all the cycles, by simply considering the last available measurements.

During the analysis period of the purity(ies), the method continues to adjust the volume carrying the characteristic point of low concentration by comparing the position of the characteristic point with the valid target position.

Several methods may be used to define the target position of the characteristic point.

According to a first method, a PID type regulation is applied to the $\varepsilon_{ext}$ or $\varepsilon_{raff}$ parameters. So if C ex t is negative, then the target position will be distant from the extract line (the target position is close to the raffinate line). Similarly, if $\varepsilon_{ext}$ is positive, then the target position will be brought closer to the extract line (the target position moves away from the raffinate line). The regulation is similar if applied to $\varepsilon_{raff}$. If $\varepsilon_{raff}$ is negative, then the target position will be far from the raffinate line (the target position is closer to the extract line). Similarly, if $\varepsilon_{raff}$ is positive, then the target position will be brought closer to the raffinate line (the target position moves away from the extract line).

According to a second method, a PID control is applied to the combination of the $\varepsilon_{ext}$ and $\varepsilon_{raff}$ deviations and, more generally, to the combination of the deviations between the measured purities and/or yields and the target purities and/or yields.

According to a third method, a function depending on the purities obtained and the target purities may be directly used to calculate the new position of the characteristic point.

During the step of defining the target position, the target position may also be defined relative to the position of the mobile phase injection on the history. This makes it possible to adapt to changes in the position of the injection point.

Optimization of the target position of the characteristic point of low concentration may be carried out automatically.

In certain advantageous embodiments, the method further comprises:
- the determination, in a node of the system, of the history of a variable that is representative of the concentration of one or more species contained in the mixture to be separated;
- the detection on the history of another characteristic point, called characteristic point of high concentration in the present description, located between the beginning of a step of collecting the raffinate and the end of the following step of collecting the extract;
- the comparison of the position of the characteristic point of high concentration against a target position;
- the adjustment of the volume carrying the characteristic point of high concentration, modifying its position to bring it closer to its target position.

The variable that is representative of the concentration, the observation node and the history, may, each and independently, be the same variable, observation node and history as those used for the detection of the characteristic point of low concentration; or may be a different variable, observation node and history.

This characteristic point of high concentration is located between the raffinate and extract lines, in other words in area 2 or in area 3, or at the interface of areas 2 and 3 (i.e. at the mean position of injection of the mixture to be separated), where the concentrations are high.

The document WO 2007/101944 describes in detail the detection and the use of this characteristic point of high concentration, which is represented, in particular, in FIGS. 6 to 11 and 18 to 21 of the document WO 2007/101944.

What has been stated above about the characteristic point of low concentration applies by analogy to the characteristic point of high concentration.

The volume carrying which is adjusted to control the position of the characteristic point of high concentration may be, for example, the volume of area 2, while any variation of the volume of area 2 is passed on identically to the volume of area 3.

Mobile Phase Volume Constraint

In the method according to the first aspect of the invention, the volume of the mobile phase injected per cycle is kept greater than, or equal to, a minimum limit and/or less than, or equal to, a maximum limit, at least during part of the method; and preferably during the entire method.

In the case where a maximum limit is imposed, when the volume of mobile phase injected per cycle reaches this maximum limit, it can no longer increase. Advantageously, when the mobile phase volume reaches the maximum limit, it remains constant at this maximum limit.

In the case where a minimum limit is imposed, when the volume of mobile phase injected per cycle reaches this minimum limit, it can no longer decrease. Advantageously, when the mobile phase volume reaches the minimum limit, it remains constant at this minimum limit.

In certain embodiments, the mobile phase volume is kept both greater than, or equal to, a minimum limit, and less than, or equal to, a maximum limit. In some embodiments, the upper limit and the lower limit are identical. In this case, the volume of mobile phase injected is regulated at a constant volume equal to the minimum (or maximum) limit.

Triggering of the Regulation According to the Invention During the Method

The regulation of the method by reference to the characteristic point of low concentration may, in certain cases, be implemented during the method, when a condition is reached, and not necessarily from the start of the method.

For example, this regulation may be triggered when the volume of mobile phase injected reaches or exceeds a certain threshold.

Thus, another object of the invention is a method for separating a mixture in a system comprising an assembly of one or more chromatography columns, the method successively comprising, in a cyclic manner:
- a step of collecting a raffinate, a step of injecting the mixture to be separated, a step of collecting an extract, and a step of injecting the mobile phase;

wherein the volume of the mobile phase injected per cycle is maintained greater than, or equal to, a minimum limit and/or less than, or equal to, a maximum limit;

the method being such that:
- as long as the volume of the mobile phase injected per cycle is greater than, or equal to, a threshold value or less than, or equal to, a threshold value, the method comprises:
  - the determination, in a node of the system, of the history of a variable that is representative of the concentration of one or more species contained in the mixture to be separated;
  - the detection on the history of a first characteristic point between the start of the step of collecting the extract and the end of the following step of injecting the mobile phase (also called characteristic point of desorption);
  - the detection on the history of a second characteristic point between the start of the step of injecting the mobile phase and the end of the following step of collecting the raffinate (also called characteristic point of adsorption);
  - the comparison of the position of each of the characteristic points against a respective target position;
  - the adjustment of the volume carrying of the first characteristic point and the volume carrying of the second characteristic point, modifying the position of the first characteristic point and the second characteristic point so as to bring them closer to their respective target positions;
- when the volume of the mobile phase injected per cycle reaches a threshold value, the method is as described above: i.e. the regulation based on the first characteristic point and on the second characteristic point, is abandoned in favor of regulation based on the characteristic point of low concentration described above.

For example, the threshold value may be the minimum limit and/or the maximum limit of the injected mobile phase. Alternatively, it may be a threshold value having a predetermined deviation from the minimum limit and/or the maximum limit.

Thus, as long as the volume of mobile phase injected per cycle has not reached the threshold value, the chromatographic method is regulated by comparing the position of two characteristic points of adsorption and desorption with a respective target position. This allows optimal precision of the regulation. When the mobile phase volume, modified due to regulation, or for any other reason, reaches the threshold value (and, for example, the minimum limit or maximum limit), the method is then regulated less precisely using the characteristic point of low concentration, as described above, which makes it possible to avoid the drawbacks linked to an excessive increase or an excessive decrease in the injected mobile phase.

Regulation by means of the two characteristic points of adsorption and desorption has been described in detail in document WO 2007/101944 as mentioned above.

In addition, what has been stated above concerning the characteristic point of low concentration applies by analogy to each of the characteristic points of adsorption and desorption.

Computer Program

Another object of the invention consists of a computer program comprising program code instructions for executing the steps of the method according to the invention when said program is executed on a computer.

The invention also relates to a computer-readable storage medium on which a computer program, as defined above, is recorded.

The invention also relates to a system comprising a processor coupled to a memory on which a computer program, as defined above, is recorded. Said system may also include the chromatographic separation system as described above, or may be only a control system, connected to the separation system and distinct from it.

Measurement of Purities and/or Yields by On-Line Detectors

According to a second aspect, the invention relates to a method for separating a mixture in a system comprising a plurality of chromatography columns, the method successively comprising, in a cyclic manner, in a given part of the system:
  a step of collecting a raffinate, a step of injecting the mixture to be separated, a step of collecting an extract and a step of injecting a mobile phase;
  wherein the method further comprises the measurement of the purity and/or of the yield of at least one collected fraction chosen from the extract and the raffinate, said measurement of purity and/or of yield comprising the following steps:
    the determination, in a node of the system, of histories of at least two respective variables that are representative of the concentration of at least two species contained in the mixture to be separated, by means of at least one fast on-line detector;
    the determination of the concentration of at least two species of the mixture to be separated in the collected fraction, from the histories;
    the determination of the purity and/or yield of the collected fraction, from the concentrations.

By "determination of histories of at least two respective variables representative of the concentration of at least two species contained in the mixture to be separated", is meant the determination of histories of at least two variables, these variables each being representative of the concentration of at least two species (i.e. of the set of at least two species) contained in the mixture to be separated.

Purity corresponds to the ratio of the concentration of one or more species in the collected fraction, compared to the sum of all the concentrations determined in the collected fraction.

The yield corresponds to the ratio of the quantity of a species in one of the two collected fractions to the total quantity of this species of the two accumulated collected fractions.

By "on-line detector" is meant within the meaning of the present invention a detector positioned at the outlet of a chromatographic column, i.e. on a connection line between two successive columns. The term "on-line detector" also means a bypass detector, the sample taking of which is positioned at the outlet of a chromatographic column, i.e. on a connection line between two successive columns. Thus, an on-line detector is not located on an outlet line of the chromatographic system (i.e. on a line for collecting the extract or the raffinate).

According to the invention, a single or, alternatively, several detectors may be used. In the case where at least two detectors are used, they may be positioned at the outlet of the same column, or at the outlet of different columns.

In a system in which a cyclic chromatographic method is implemented, two types of detectors may be used: fast detectors and slow detectors. In this second aspect of the invention, the at least one on-line detector used is a fast detector.

By "fast detector" is meant, within the meaning of the present invention, a detector whose response time is less than one twentieth of the duration of a cycle. By "slow detector" is meant a detector whose response time is greater than one-twentieth of the duration of a cycle.

A fast detector emits a signal depending on the concentration profile of the compounds moving inside the detector. It may therefore make it possible to detect a characteristic point on a history, for example for the implementation of the separation method according to the first aspect of the invention.

As a fast detector, mention may be made of UV/visible absorbance detectors, measuring at one or more wavelengths, colorimeters, densimeters, conductometers, refractometers, Brix meters, polarimeters, nuclear magnetic resonance devices and NIR (near infrared), IR (infrared), FTIR (Fourier Transform Infrared Spectroscopy), and Raman spectrometers. A temperature detector may be used to correct the signal given by the above mentioned detectors.

In certain embodiments, the at least one fast on-line detector is chosen from the fast detectors mentioned above, provided that the at least two variables that are representative of the concentration of at least two species contained in the mixture to be separated, are detected and different.

The at least one detector can measure one or more variables representative of the concentration of at least two species contained in the mixture to be separated. Thus, for example, the spectrometric type detectors, after calibration of the absorption or emission wavelengths for the species to be separated, may make it possible to measure the concentration of said species with a single device.

The use of a single fast detector sometimes does not allow precise measurement of a concentration of a species to be achieved.

As illustrated in Example 6, the use of a combination of a polarimeter and a densimeter during the purification of a mixture comprising glucose, fructose and polymers of glucose in minority quantity makes it possible to obtain variables that are representative of the concentrations of the species of the mixture: the densimeter gives information on the sum of all the concentrations while the polarimeter measures a rotation of polarized light, knowing that glucose and glucose polymers present a positive contribution while fructose presents a negative contribution. In this case, the representative variables are density and polarity. The combination of the values of these variables obtained by the two detectors makes it possible to evaluate the concentrations of species of the mixture (after a calibration of the detectors).

In the case of the use of a spectrometer (IR, NIR, FTIR, Raman . . . ), each measurement of the spectrometer returns an information vector made up of a set of absorption or emission values at different wavelengths. The adsorption or emission at these different wavelengths is each potentially a variable that is representative of a concentration of the species. In fact, a combination of these adsorption or emission values makes it possible to estimate the value of the concentrations of one or more of the species. The determination of such a combination is performed by standard chemometric tools. In some embodiments, at least two fast on-line detectors are used to determine the histories. Preferably, they are chosen from the fast detectors mentioned above.

In some embodiments, the at least two in-line detectors are a polarimeter and a densimeter.

According to other embodiments, the at least two on-line detectors are a densimeter and a conductometer.

In certain embodiments, the at least two species of the mixture to be separated are monosaccharides. In these embodiments, the extract and the raffinate are enriched with different monosaccharides. In particular, the monosaccharides are chosen from the monosaccharides mentioned above.

In certain embodiments, the at least two species of the mixture to be separated are glucose and fructose. In these embodiments, the mixture to be separated may contain only glucose and fructose, optionally diluted in a solvent, for example water. Alternatively, the mixture to be separated may contain one or more other compounds, such as glucose polymers.

Advantageously, when the at least two species of the mixture to be separated are glucose and fructose, at least two on-line fast detectors are used, preferably a polarimeter and a densimeter.

According to other embodiments, the at least two species of the mixture to be separated are an ionized species, for example in the form of a salt, and a non-ionized species. In these embodiments, the extract and the raffinate are enriched with different species, i.e. the extract is enriched with ionized species and the raffinate is enriched with non-ionized species or vice versa (the extract is enriched with non-ionized species and the raffinate is enriched with ionized species).

As ionized species, mention may be made of amino acids, salts or organic acids which are in ionized form at the pH and at the operating temperature of the chromatographic separation.

As a non-ionized species at the pH and at the operating temperature of the chromatographic separation, we may mention alcohols and sugars, such as the monosaccharides and polysaccharides mentioned above.

Advantageously, when the at least two species of the mixture to be separated are an ionized species and a non-ionized species, at least two fast on-line detectors are used, preferably a hydrometer and a conductometer.

In certain embodiments, the method according to the invention comprises, after the step of determining histories of at least two respective variables representative of the concentration of at least two species contained in the mixture to be separated, a step of determination of the mean value of each variable over a measurement interval of the histories.

According to other embodiments, the method according to the invention comprises, after the step of determining histories of at least two respective variables representative of the concentration of at least two species contained in the mixture to be separated, a step of determining the value of the integration of each variable over a measurement interval of the histories.

In the foregoing, each measurement interval of history may be defined in full by collecting the fraction in question. In other words, the said history measurement interval corresponds, during a cycle, to the times (or volumes) at which the collection line of the considered fraction is between the same successive columns as the detector in question.

Said measurement interval may also correspond to only part of the collection of the fraction in question.

Said measurement interval may also correspond to part or all of the collection of the fraction in question, and to a part of the history immediately following the collection of the fraction in question.

Said measurement interval may also correspond to part or all of the collection of the fraction in question, and to a part of the history immediately preceding the collection of the fraction in question.

These last three embodiments are particularly useful if asymmetry is present in the chromatography system.

This measurement of purities and/or yields may be used with all prior art control methods requiring a purity measurement to perform actions.

In certain embodiments, the method according to the invention further comprises:
  the determination, in a node of the system, of the history of a variable that is representative of the concentration of one or more species contained in the mixture to be separated;
  the detection on the history of a characteristic point of high concentration located between the beginning of a step of collecting the raffinate and the end of the following step of collecting the extract;
  the comparison of the position of the characteristic point of high concentration against a target position;
  the adjustment of the volume carrying the characteristic point of high concentration, modifying the position of the characteristic point of high concentration to bring it closer to its target position.

What has been stated above with regard to the characteristic point of high concentration may thus apply to the second aspect of the invention.

In certain embodiments, the method according to the invention further comprises:
  the detection on the history of a first characteristic point between the start of the step of collecting the extract and the end of the following step of injecting the mobile phase (also called characteristic point of desorption);
  the detection on the history of a second characteristic point between the start of the step of injecting the mobile phase and the end of the following step of collecting the raffinate (also called characteristic point of adsorption);
  the comparison of the position of each of the characteristic points against a respective target position;
  the adjustment of the volume carrying the first characteristic point and the volume carrying the second characteristic point, modifying the position of the first characteristic point and the second characteristic point to bring them closer to their respective target positions.

What has been stated above with regard to the characteristic points of adsorption and desorption may thus apply to the second aspect of the invention.

In certain embodiments, the method according to the invention further comprises:
  the determination, in a node of the system, of the history of a variable that is representative of the concentration of one or more species contained in the mixture to be separated;
  the detection on said history of a characteristic point of low concentration between the start of a step of collecting the extract and the end of the following step of collecting the raffinate;
  the comparison of the position of the characteristic point of low concentration against a target position;
  the adjustment of the volume carrying the characteristic point of low concentration, modifying the position of the characteristic point of low concentration to bring the position of the characteristic point of low concentration closer to its target position;

preferably, the volume of the mobile phase injected per cycle is maintained greater than, or equal to, a minimum limit and/or less than, or equal to, a maximum limit.

What has been stated above concerning the characteristic point of low concentration may thus apply to the second aspect of the invention.

In the above embodiments, the histories on which the characteristic point of high concentration are detected, the characteristic points of adsorption and desorption, the characteristic point of low concentration, and the histories from which the concentration of at least two species of the mixture to be separated in at least one collected fraction, are determined, may independently be the same histories or different histories. The same is true for the variables that are representative of the concentration of species contained in the mixture to be separated.

In some embodiments, the method also includes a step of comparing the measured purity and/or the measured yield with a target purity and/or a target yield. If the purity and/or the yield are measured in the extract and in the raffinate, the method may comprise a step of comparing the two purities and/or yields measured with their respective target purity and/or yield.

In certain embodiments, the method according to the invention may also comprise a step of modifying the volume of mixture to be separated that is injected per cycle according to the difference between the measured purity(ies) and the target purity(ies) (and/or the difference between the measured yield(s) and the target yield(s)).

In certain embodiments, the method according to the invention comprises a step of modifying the volume of mobile phase injected per cycle according to the difference between the measured purity(ies) and the target purity(ies) (and/or the difference between the measured yield(s) and the target yield(s)).

In certain embodiments, the volume of mixture injected per cycle and the volume of mobile phase injected per cycle are modified jointly according to the difference between the measured purity(ies) and the target purity(ies) (and/or the difference between the measured yield(s) and the target yield(s)).

In certain embodiments, the method comprises a step of defining the target position of the characteristic point(s) according to the difference between the measured purity(ies) and the target purity(ies) (and/or the difference between the measured yield(s) and the target yields(s)). This may be the definition of the target position of the characteristic point of high concentration and/or the definition of the target position of the characteristic point of adsorption and/or that of the characteristic point of desorption and/or that of the characteristic point of low concentration.

What has been stated above with regard to the comparison of a measured purity and/or a yield with a target purity and/or yield, of the modification, according to this comparison, of the volume of mixture injected and of the mobile load volume and of the definition, according to this comparison, of the target position of the characteristic point may thus be applied to the second aspect of the invention.

In certain embodiments of the invention, magnitudes such as the mean operating speed of the fluid in the columns may also be modulated if it is desired to modify the production of the system, or to control the pressure on one or more columns of the system.

Another object of the invention is a computer program comprising program code instructions for executing the steps of the method according to the second aspect of the invention when said program is executed on a computer.

The invention also relates to a computer-readable storage medium on which a computer program as defined above, is recorded.

The invention also relates to a system comprising a processor coupled to a memory on which a computer program as defined above is recorded. Said system may also include the chromatographic separation system as described above, or may only be a control system, connected to the separation system and distinct from it.

Measurement of Purities and/or Yields on an Intermediate Tank

According to a third aspect, the invention relates to a method for the separation of a mixture in an installation comprising:

a first system comprising a plurality of chromatography columns, an outlet line for collecting a raffinate, and an outlet line for collecting an extract;

at least one second system placed downstream of the first system; and at least one tank supplied by one of said outlet lines of the first system, and supplying the second system, preferably with a continuous flow;

the method comprising successively, in a cyclic manner, in a given part of the first system:

a step of collecting a raffinate, a step of injecting the mixture to be separated, a step of collecting an extract, and a step of injecting a mobile phase;

wherein the method further comprises the measurement of the purity and/or of the yield of at least one collected fraction chosen from the extract and the raffinate, said measurement of purity and/or of yield comprising the following steps:

the determination of the concentration of at least two species of the mixture to be separated in the fraction collected in the tank;

the determination of the purity and/or the yield in at least one species of the fraction collected in the tank.

The determination of the purity and/or of the yield in at least one species of the fraction collected in the tank is performed based on the concentrations of the at least two species of the mixture to be separated as determined in the fraction collected in the tank.

The purity corresponds to the ratio of the concentration of one or more species in the fraction collected in the tank, compared to the sum of all the concentrations determined in the fraction collected in the tank.

The yield corresponds to the ratio of the quantity of a species in one of the two collected fractions to the total quantity of this species of the two collected fractions taken together.

The at least one second system preferably operates with a continuous supply and at stable flow and composition. The tank guarantees a continuous supply from the second system in the event of a short shutdown of the first system. The presence of the tank may, for example, allow one hour of operation of the second system in the event of a shutdown of the chromatography installation. The tank also makes it possible to make the flow rate uniform and to smoothen the composition of the fraction collected before supplying it to the second system, in the event of asymmetry in the first system from one column to another. Preferably, the tank is periodically supplied by a collected fraction and constantly emptied towards the second system. It is never purged or even completely rinsed between each cycle of the system.

In the case of an equilibrium chromatography system, the fraction contained in the tank has a mean composition that is very close to the mean composition of the fraction collected over a cycle.

When the chromatography system is modified or evolving, the composition of the fraction contained in the tank is not strictly equal to the composition of the fraction directly collected over a cycle of the system, as the composition of the fraction contained in the tank evolves with a delay compared to the composition of the fraction directly collected, due to the duration of the renewal of the tank. The renewal of the content of the tank is all the more delayed when the volume of the tank is large. However, this measurement remains sufficiently representative, in particular to allow regulation of the chromatography system.

In the present description, the terms "outlet line" and "collection line" have the same meaning.

In certain embodiments, the determination of the concentration of at least two species of the mixture to be separated in the fraction collected in the tank is performed by means of at least one detector, preferably a slow detector.

As slow detectors, we may mention near infrared spectrometers, infrared spectrometers, Fourier Transform Infrared Spectrometers and Raman spectrometers, in the case where the acquisition of several spectra is necessary to obtain a signal allowing precise measurement, as the total acquisition time may then be substantial. Mention may also be made, in the context of a slow detector, of all nuclear magnetic resonance techniques.

According to other embodiments, the concentration of at least two species of the mixture to be separated in the fraction collected in the tank is determined by means of an analytical chromatography system, such as High Performance Liquid Chromatography (HPLC), Ultra Performance Liquid Chromatography (UPLC), Ultra High Pressure Liquid Chromatography (UHPLC), Gas Chromatography (GC).

The second system may, in particular, be a chromatography unit, an enzymatic transformation unit, a chemical transformation unit, a distillation unit, a membrane concentration unit, or an evaporation unit. In some embodiments, the second system is an evaporation unit.

The installation includes a tank (or "intermediate tank") supplied by an outlet line. The tank may, therefore, be supplied by the raffinate outlet line, or by the extract outlet line; respective tanks may be supplied by each outlet line (i.e. the outlet line of the raffinate and that of the extract). The tank is supplied with the fraction collected in the outlet line on which it is present. The tank is connected, directly or indirectly, to a second system which is supplied by the fraction contained in the tank.

Preferably, the tank has a volume less than the volume of the collected fraction (i.e. the collected fraction which supplies it) over a cycle. In some embodiments, the tank contains a fraction volume equal to the volume of the fraction collected over a period of one to five periods, preferably over three periods.

Particularly advantageously, when several purity and/or yield measurements are carried out successively, the tank is not cleaned and/or purged and/or rinsed between these measurements.

The mixture to be separated may contain the species already mentioned above.

In certain embodiments, the at least two species of the mixture to be separated whose concentration is determined, are monosaccharides. In these embodiments, the extract and the raffinate are enriched with different monosaccharides. In particular, the monosaccharides are chosen from the monosaccharides mentioned above in the description of the first aspect of the invention.

In certain embodiments, the at least two species of the mixture to be separated are glucose and fructose.

In certain embodiments, the method according to the invention further comprises:
  the determination, in a node of the system, of the history of a variable that is representative of the concentration of one or more species contained in the mixture to be separated;
  the detection on the history of a characteristic point of high concentration located between the beginning of a step of collecting the raffinate and the end of the following step of collecting the extract;
  the comparison of the position of the characteristic point of high concentration against a target position;
  the adjustment of the volume carrying the high concentration characteristic point, modifying the position of the characteristic point of high concentration to bring it closer to its target position.

What has been stated above about the characteristic point of high concentration may be applied to the third aspect of the invention.

In certain embodiments, the method according to the invention further comprises:
  the detection on the history of a first characteristic point between the start of the step of collecting the extract and the end of the following step of injecting the mobile phase (also called characteristic point of desorption);
  the detection on the history of a second characteristic point between the start of the step of injecting the mobile phase and the end of the following step of collecting the raffinate (also called characteristic point of adsorption);
  the comparison of the position of each of the characteristic points against a respective target position;
  the adjustment of the volume carrying the first characteristic point and the volume carrying the second characteristic point, modifying the position of the first characteristic point and the second characteristic point to bring them closer to their respective target positions.

What has been stated above concerning the characteristic points of adsorption and desorption may be applied to the third aspect of the invention.

In certain embodiments, the method according to the invention further comprises:
  the determination, in a node of the system, of the history of a variable that is representative of the concentration of one or more species contained in the mixture to be separated;
  the detection on said history of a characteristic point of low concentration between the start of a step of collecting the extract and the end of the following step of collecting the raffinate;
  the comparison of the position of the characteristic point of low concentration against a target position;
  the adjustment of the volume carrying the characteristic point of low concentration, modifying the position of the characteristic point of low concentration to bring the position of the characteristic point of low concentration closer to its target position;
  preferably, the volume of the mobile phase injected per cycle being maintained greater than, or equal to, a minimum limit and/or less than, or equal to, a maximum limit.

What has been stated above about the characteristic point of low concentration may be applied to the third aspect of the invention.

In some embodiments, the method also includes a step of comparing the measured purity and/or the measured yield with a target purity. If the purity and/or the yield are measured in the extract and in the raffinate, the method may comprise a step of comparing the two measured purities and/or yields with a respective target purity and/or yield.

In certain embodiments, the method according to the invention also comprises a step of modifying the volume of mixture to be separated that is injected per cycle according to the difference between the measured purity(ies) and the target purity(ies) (and/or the difference between the measured yield(s) and the target yield(s)).

In certain embodiments, the method according to the invention comprises a step of modifying the volume of mobile phase injected per cycle according to the difference between the measured purity(ies) and the target purity(ies), (and/or the difference between the measured yield(s) and the target yield(s)).

In certain embodiments, the volume of mixture injected per cycle and the volume of mobile phase injected per cycle are modified jointly according to the difference between the measured purity(ies) and the target purity(ies) (and/or the difference between the measured yield(s) and the target yield(s)).

In certain embodiments, the method comprises a step of defining the target position of the characteristic point(s) according to the difference between the measured purity(ies) and the target purity(ies) (and/or the difference between the measured yield(s) and the target yield(s)). It may be the definition of the target position of the characteristic point of high concentration and/or the definition of the target position of the characteristic point of adsorption and/or that of the characteristic point of desorption and/or that of the characteristic point of low concentration.

What has been stated above with regard to the comparison of a measured purity and/or yield with a target purity and/or a yield, of the modification, according to this comparison, of the volume of mixture injected and the mobile load volume, and the definition, according to this comparison, of the target position of the characteristic point, may be applied to the third aspect of the invention.

Another object of the invention consists of a computer program comprising program code instructions for executing the steps of the method according to the third aspect of the invention when said program is executed on a computer.

The invention also relates to a computer-readable storage medium on which a computer program as defined above is recorded.

The invention also relates to a system comprising a processor coupled to a memory on which a computer program as defined above is recorded. Said system may also include the chromatographic separation system as described above or may only be a control system, connected to the separation system and distinct from it.

EXAMPLES

The following examples illustrate the invention without limiting it.

In Examples 1 to 5 which follow, a chromatographic simulation model was used with the following parameters:
species present in the mixture to be separated: glucose polymers of an order greater than, or equal to, 2, glucose and fructose;
stationary phase: resin XA2004/30 Ca from Novasep;
mobile phase: water;
elution temperature: between 55° C. and 65° C.

These concentration graphs representing a loading pulse, saturation at high concentration and saturation at low concentration, in a column 2 meters long and 8.5 cm in diameter, at a flow rate of 20 mL/min, are represented respectively in FIGS. 5.A, 5.B and 5.C. These data make it possible to reconstruct the model used, using any chromatographic simulation software, using for example the methods described in the manual *Preparative Chromatography of Fine Chemicals and Pharmaceutical Agents*, Henner Schmidt-Traub, Wiley-VCH, ISBN-13 978-3-527-30643-5.

The method applied in Examples 1, 2, 4 and 5 is an SSMB4 with a total column height of 8 meters.

The method applied in Example 3 is an SMB with a total column height of 8 meters.

In Examples 6 to 7 which follow, a real chromatographic separation was carried out on a pilot, with the following parameters:
species present in the mixture to be separated: glucose polymers of order greater than or equal to 2, glucose and fructose;
stationary phase: resin XA2004/30 Ca from Novasep;
mobile phase: water;
elution temperature: between 55° C. and 65° C.;
the pilot is made up of 4 columns 2 meters long and 8.5 cm in diameter;
the product and eluent flow rates are between 20 and 30 mL/min;
the method applied is an SSMB with a total column height of 8 meters.

Example 1

A simulation of the chromatographic method as described above is carried out.

Between cycle No. 1 and cycle No. 10, the system is stabilized, the volumes of the different areas are fixed and kept constant. The volume of the injected mobile phase is 0.18 BV (bed volume).

From cycle No. 10, the areas are regulated with target positions of characteristic points located at +0.17 for area 4 (deviation of the target position from the characteristic point of adsorption in volume divided by the cycle volume, relative to the mean eluent injection position), and −0.17 for area 1 (deviation from the target position of the characteristic point of desorption in volume divided by the cycle volume, relative to the mean position of eluent injection). This corresponds to a target position of the characteristic point of low concentration located on the mean eluent injection point.

A comparison is then made between a method regulated using the two characteristic points of adsorption and desorption, without limitation of volume of mobile phase (as described in the document WO 2007/101944), and a method regulated using the characteristic point of low concentration according to the invention in which a maximum volume threshold has been imposed.

The results are summarized in FIGS. 6, 7, 8 and 9.

It may be seen that when the method is regulated using the two characteristic points of adsorption and desorption, wherein the two characteristic points each reach their target position. It is the same for the characteristic point of low concentration. In order to achieve these characteristic point position objectives, the mobile phase volume is increased to 0.27 BV.

In the second case, the mobile phase volume is limited to 0.22 BV and the chromatographic method is regulated according to the invention using the characteristic point of low concentration. The characteristic point of low concentration remains unchanged. It is found that the target position of the point of low concentration is reached, the characteristic point reaches the position of the eluent injection point. However, the target positions of the characteristic points of adsorption and desorption are not reached. The mobile phase volume required to reach these target positions has not been reached and has been limited to the predefined maximum value. The characteristic points of adsorption and desorption are located at +0.143 and −0.143 relative to the mean position of eluent injection (in volume divided by the cycle volume), respectively. The absolute values of the deviations between each of the characteristic points of adsorption and desorption and their target position are identical and the sum of the deviations is zero.

Thus, the method according to the invention makes it possible to avoid exceeding a high limit of the volume of mobile phase used, which does not allow a method regulated by taking into account two characteristic points of adsorption and desorption.

Example 2

A chromatographic method simulation as described above is carried out.

Between cycle No. 1 and cycle No. 10, the system is stabilized, the volumes of the different areas are fixed and kept constant. The mobile phase volume is 0.25 BV.

From cycle No. 10, the areas are regulated with target positions of characteristic points located at +0.10 for area 4 (position of the characteristic point of adsorption in volume divided by the cycle volume, relative to the mean position of the eluent injection) and −0.10 for area 1 (position of the characteristic point of desorption in volume divided by the cycle volume, relative to the mean position of eluent injection). This corresponds to a target position of the characteristic point of low concentration located at the mean eluent injection point.

A comparison is then made between a method regulated using the two characteristic points of adsorption and desorption, without limitation of volume of mobile phase (as described in the document WO 2007/101944), and a method regulated using the characteristic point of low concentration according to the invention in which a minimum volume threshold has been imposed.

The results are summarized in FIGS. 10, 11, 12 and 13.

It may be seen that when the method is regulated using the two characteristic points of adsorption and desorption, the two characteristic points each reach their target position (at +0.10 and −0.10). It is the same for the characteristic point of low concentration. In order to achieve these characteristic point position objectives, the mobile phase volume is reduced to 0.18 BV.

In the second case, the mobile phase volume is minimized to 0.20 and the chromatographic method is regulated according to the invention using the characteristic point of low concentration. The characteristic point of low concentration remains unchanged. It may be seen that the target position of the point of low concentration is reached at the eluent injection point. However, the target positions of the characteristic adsorption and desorption points are not reached. The mobile phase volume to reach these target positions has not been reached and has been limited to the predefined minimum value. The characteristic points of adsorption and desorption are located at +0.12 and −0.12 relative to the mean position of eluent injection (in volume divided by the volume of the cycle). The differences between each of the characteristic points of adsorption and desorption and their target position are identical.

Thus, the method according to the invention makes it possible not to exceed a low limit of the volume of mobile phase used, which does not allow a method regulated by taking into account two characteristic points of adsorption and desorption.

Example 3

A simulation of the chromatographic method as described above is carried out.

Measurements of purity and of fructose yield in the extract and raffinate fraction are performed while these fractions are collected in tanks placed at the chromatography outlet and with continuous drawing off from each of them so that the mean volume in the tanks represents three periods Between cycle No. 1 and cycle No. 10, the system is stabilized, the volumes of the different areas are fixed and kept constant. The volume of mixture to be separated (load) injected is 0.175 BV. The yield is 90.3% and the purity is 84.9%. The target position of the characteristic point of low concentration is located on the mean eluent injection point.

From cycle No. 10, the areas as well as the volume of charge injected are regulated with objectives of a purity of 90% and a yield of 85% for the extract fraction. The mobile phase volume is kept constant at the value of +0.2 BV by using the regulation using the characteristic point of low concentration of the method according to the invention.

Figure 14:
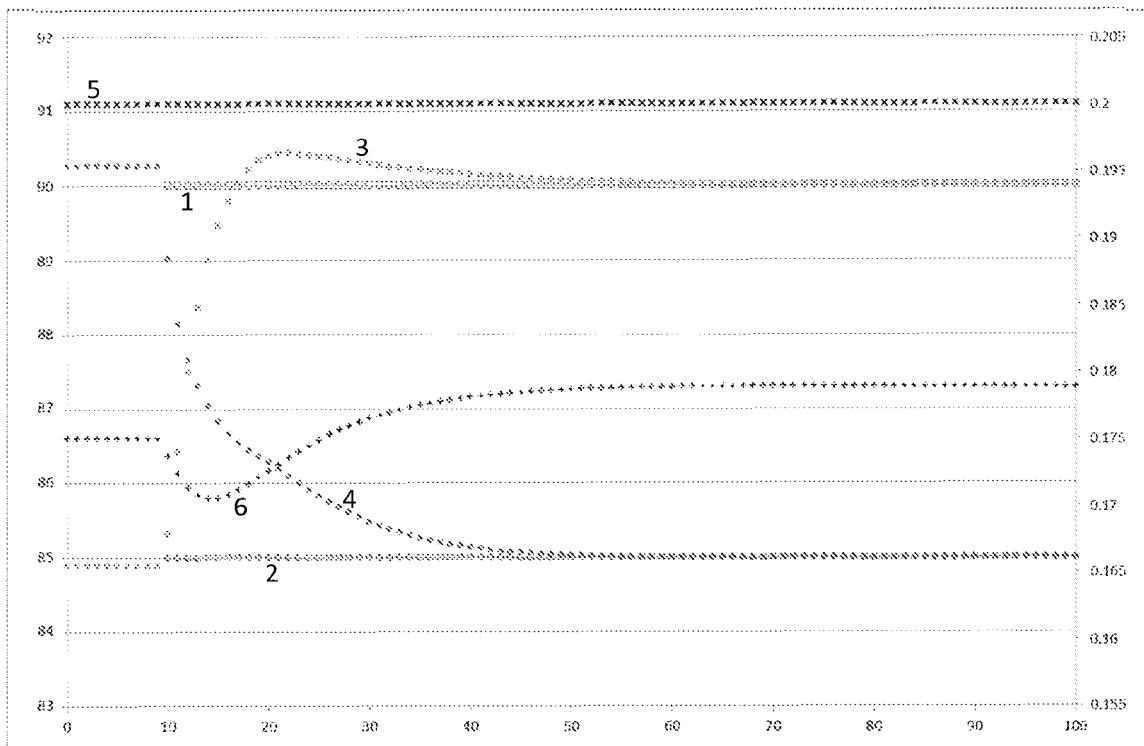
FIGS. 14, 15, 16, 17, 18 and 21 show the evolution of the purity and the yield (ordinate axis on the left, as a percentage) and the evolution of the eluent and injection mixture volumes (ordinate axis on the right, as a volume ratio compared to column volume (bed volume {BV}), as a function of the number of cycles during the implementation of the method described in Example 3 (FIG. 14), Example 4 (FIG. 15), Example 5 (FIGS. 16, 17 and 18) and Example 7 (FIG. 21). The target purity is represented by the gray "□" symbol (curve 1), the target yield is represented by the gray "○" symbol (curve 2), the measured purity is represented by the gray "■" symbol (curve 3), the measured yield is represented by the gray "•" symbol (curve 4), the injected eluent volume per cycle is represented by the black "x" symbol (curve 5), while the injected volume of mixture to be separated per cycle is represented by the symbol "+" (curve 6).

The results are summarized in FIG. 14.

The characteristic point of low concentration is regulated on the mean position of injection of the eluent. The volume of the mobile phase is thus kept constant and controlled.

The yield and purity objectives are achieved and the volume of charge injected is increased to +0.179 BV.

Example 4

A simulation of the chromatographic method as described above is carried out.

Purity and fructose yield measurements in the extract fraction are carried out.

Between cycle No. 1 and cycle No. 10, the system is stabilized, the volumes of the different areas are fixed and kept constant. The volume of mixture to be separated (load) injected is 0.175 BV. The yield is 90.3% and the purity is 84.9%. The mobile phase volume is constant at the value of +0.2 BV. The target position of the characteristic point of low concentration is located on the mean eluent injection point.

From cycle No. 10, the method is regulated using the characteristic point of low concentration according to the method of the invention, with purity and yield targets of 90% and 85% respectively and a volume of charge injected is kept constant at the value of +0.175 BV.

Figure 15:
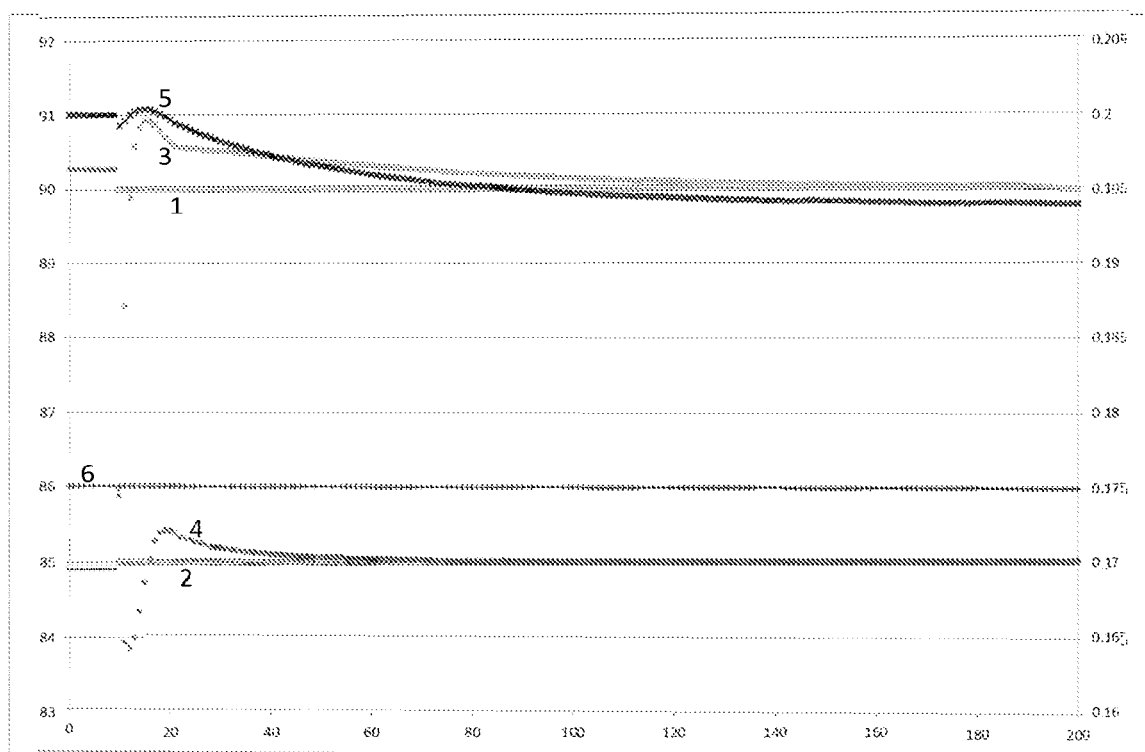

The results are summarized in FIG. 15.

The characteristic point of low concentration is regulated at the mean position of the eluent injection. The volume of the mobile phase is thus controlled.

The yield and purity objectives are achieved and the volume of mobile phase is reduced to +0.194 BV.

Example 5

A chromatographic method simulation as described above is carried out.

Purity and fructose yield measurements in the extract fraction are carried out.

The target position of the characteristic point of low concentration is optimized according to the desired purity and yield.

In a first test, the target position of the characteristic point of low concentration is fixed at −0.1 BV (at the extract) relative to the mean position of injection of the eluent, while the regulation described in example 4 is applied.

Figure 16:
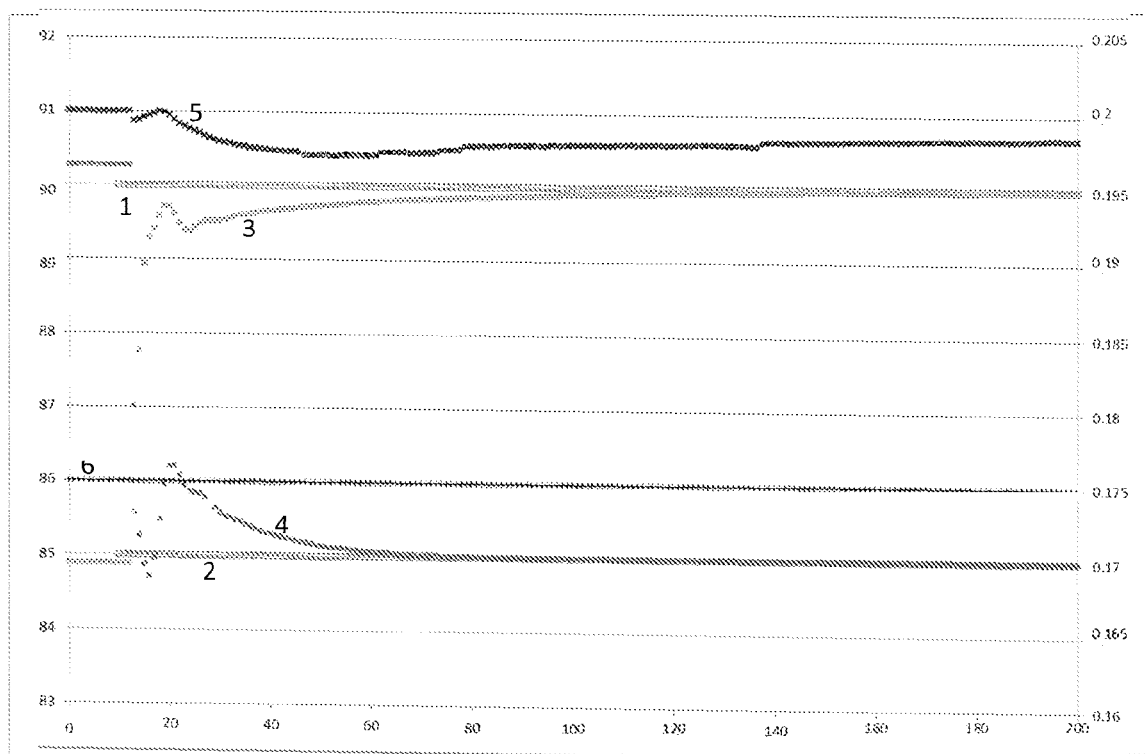

The results are summarized in FIG. 16. A mobile phase volume of +0.198 BV is obtained.

In a second test, the target position of the characteristic point of low concentration is fixed at +0.1 BV (towards the raffinate) relative to the mean position of injection of the eluent, and the regulation described in example 4 is applied.

Figure 17:
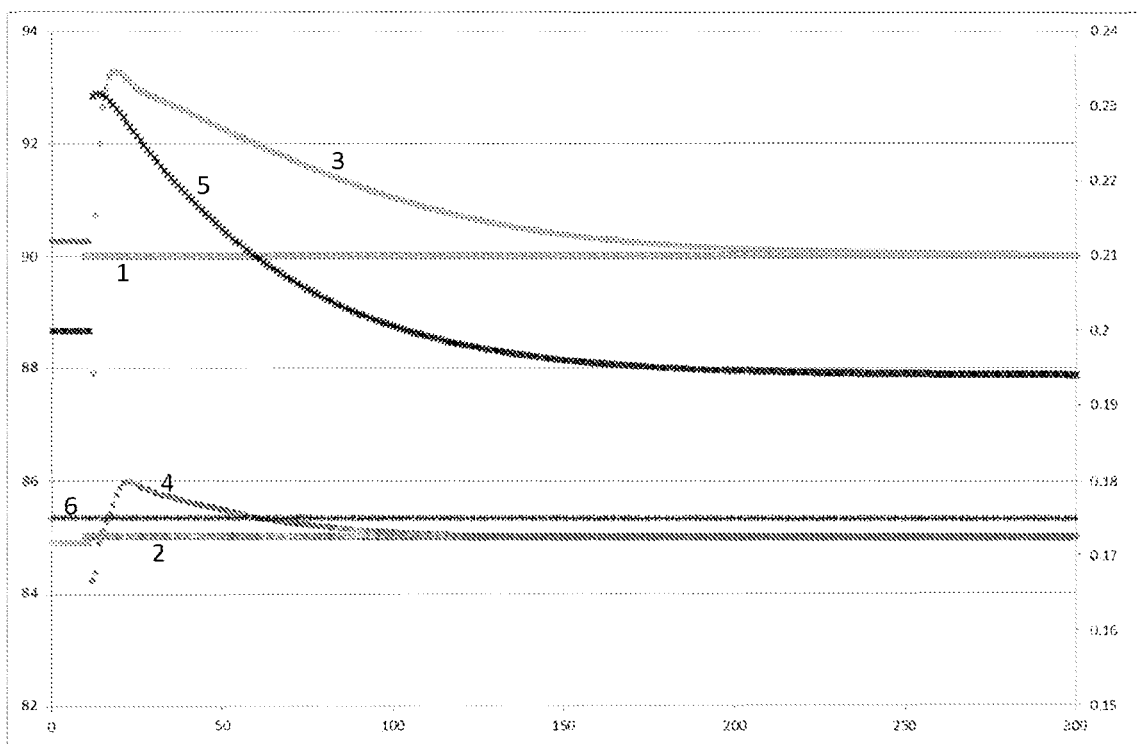
Figure 18:
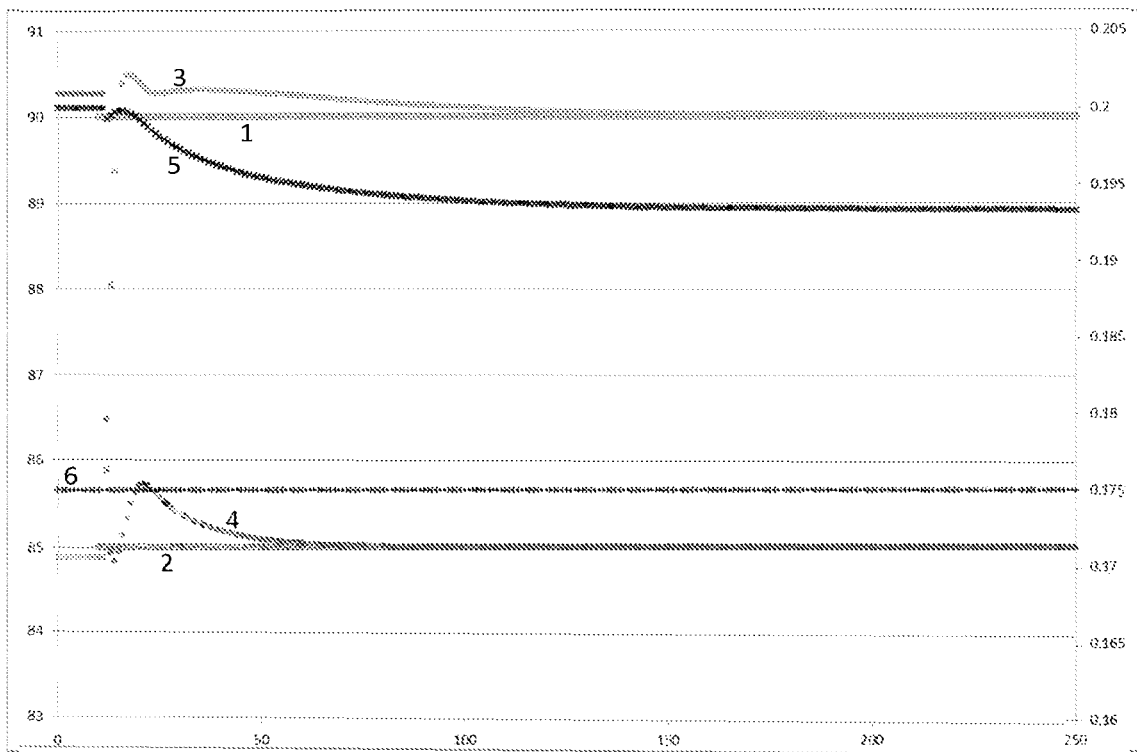
Figure 19:
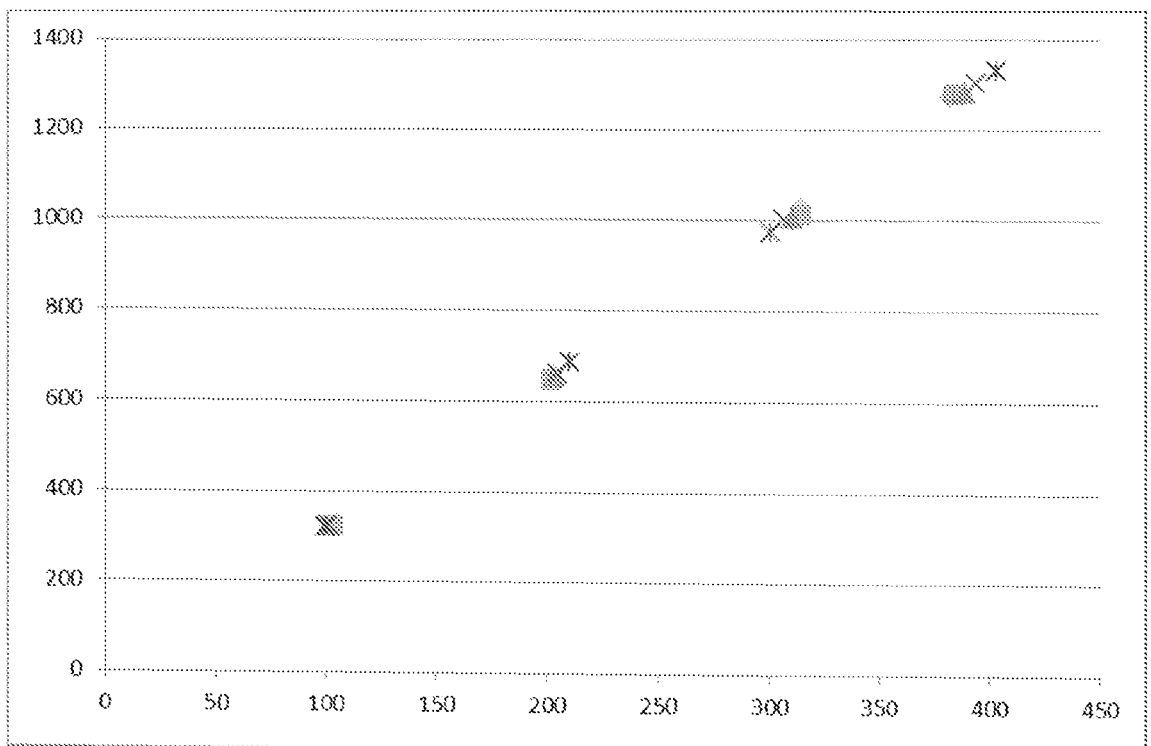
FIGS. 19 and 20 show the evolution of the optical rotation of glucose (FIG. 19) and fructose (FIG. 20), as a function of the temperature and the concentration of glucose (FIG. 19) and fructose (FIG. 20) that are obtained during the calibration of the polarimeter of Example 6. The abscissa axis corresponds to the concentration of the species (glucose or fructose) in g/L. The ordinate axis corresponds to the optical rotation. Optical rotations are measured at a temperature of 20° C. (symbol "♦"), 35° C. (symbol "■"), 45° C. (symbol "▲"), 55° C. (symbol "x") and 65° C. (symbol "ж").
Figure 20:
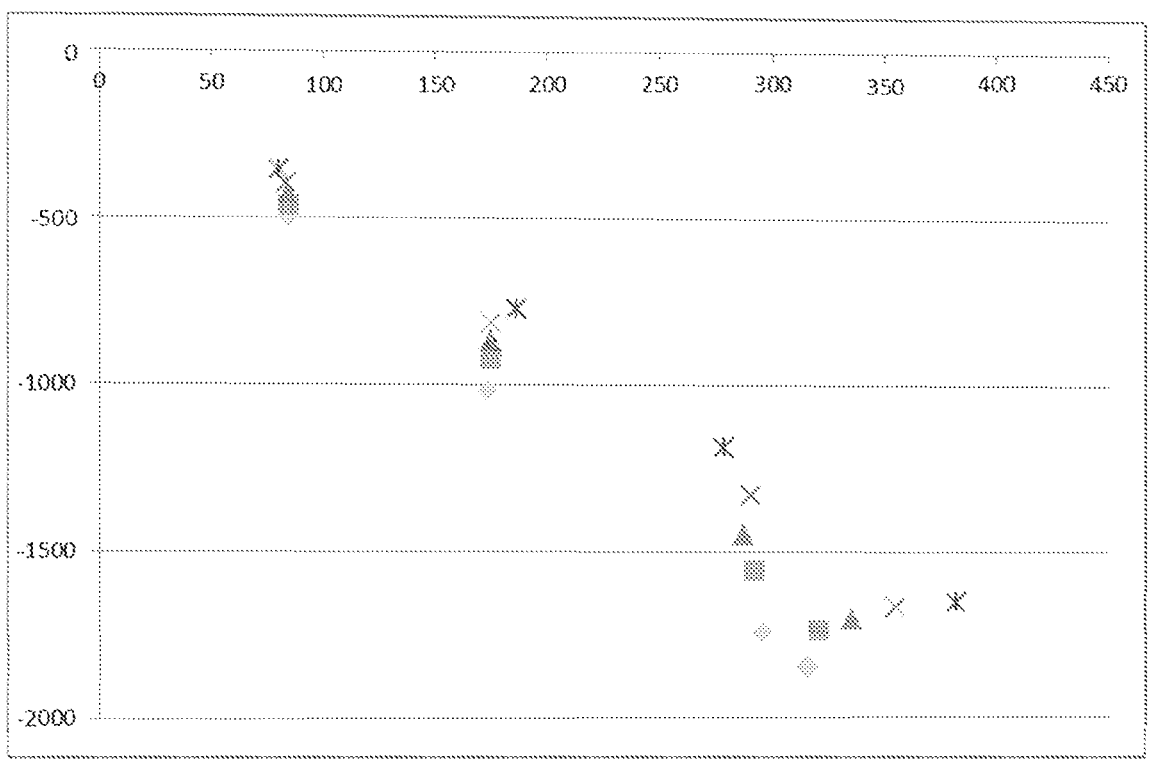

The results are summarized in FIG. 17. A volume of mobile phase is obtained of +0.194 BV.

It is thus possible to position the characteristic point of low concentration so as to obtain the minimum volume of mobile phase. With a characteristic point positioned at +0.04 BV towards the raffinate relative to the mean position of injection of the eluent, the minimum mobile phase volume of this separation is obtained (at a value of +0.193 BV) with an injected load volume fixed at +0.175 BV. The results are summarized in FIG. 18.

Example 6

An experimental chromatographic test as described above is carried out.

A chromatographic method is used to treat a mixture to be separated containing glucose, fructose and a small amount of glucose polymer (with a degree of polymerization of 2 (DP2), 3 (DP3) and above).

A densimeter and a polarimeter are calibrated for the two species to be separated (glucose and fructose), as a function of the temperature and as a function of the concentration of the species. The results of the polarimeter calibration are summarized in FIGS. 19 and 20.

Two histories are then measured using the previously calibrated densimeter and polarimeter positioned in line.

FIGS. 1 and 2 illustrate the example because from these histories, on a cycle, the signal from each detector is integrated on the portion of the history corresponding to a fraction collection, for each fraction (the extract and the raffinate), in order to determine a "mean" density and a "mean" polarity for each fraction collected.

The glucose and the mixture of glucose polymers are dextrorotatory, i.e. the angle of rotation induced by the glucose and the glucose polymers measured by a polarimeter is positive. Fructose is levorotatory, i.e. the angle of rotation induced by fructose measured by a polarimeter is negative.

The angle of rotation measured by a polarimeter during a measurement on a mixture is the sum of the angles of rotation induced by the different species contained in the mixture in a unitary manner.

Thus, we can establish the following equation:

$$\alpha = \alpha(T)^{Glucose} \cdot C^{Glucose} + \alpha(T)^{Fructose} \cdot C^{Fructose},$$

in which:
$\alpha$ is the angle of the glucose/fructose mixture measured by the polarimeter,
$\alpha(T)$ is the angle of rotation of the species at the temperature applied to the measurement, obtained during the calibration of the polarimeter, and
C is the concentration of the species.

Measuring the density of a mixture of glucose and fructose with a densimeter as a function of the concentrations of each sugar meets the following equation:

$$\text{Density} = \beta(T) \cdot (C^{Glucose} + C^{Fructose}) + \text{Density}_{Eluent}(T),$$

in which:
Density is the density measured by the densimeter,
$\text{Density}_{Eluent}(T)$ is the density of the eluent at the temperature of the measurement,
$\beta(T)$ is the density factor of glucose and fructose at the temperature applied to the measurement, this factor being identical for pure glucose and fructose at a given temperature, and
C is the concentration of the species.

These two equations allow, from the mean density and angle of rotation characterizing each fraction, the calculation, using the Gauss pivot method, of the concentration of glucose and fructose in the mixture. The purity of each fraction of glucose and fructose may then be calculated from these concentrations.

This method allows the glucose and fructose concentrations of a collected fraction to be measured relatively accurately. The purities of the extract and of the raffinate may also be corrected at the margin of a corrective term depending on the distribution of other minority impurities such as glucose polymers between these two collected fractions.

Example 7

An experimental chromatographic test as described above is carried out.

Purity and fructose yield measurements in the extract fraction are carried out.

Between cycle No. 1 and cycle No. 20, the system is stabilized and regulated.

The volume of mixture to be separated (load) injected is 0.15 BV. The yield is 90% and the purity is 90%. The target position of the characteristic point of low concentration is located on the mean eluent injection point.

From cycle No. 20, the areas as well as the volume of load injected are regulated with objectives of a purity of 86% and a yield of 92%. The mobile phase volume is kept constant at the value of +0.18 BV using the regulation using the characteristic point of low concentration of the method according to the invention. From cycle No. 60, oscillations on the concentration of the injected load were made, wherein the control method maintained the performance of the system.

Figure 21:
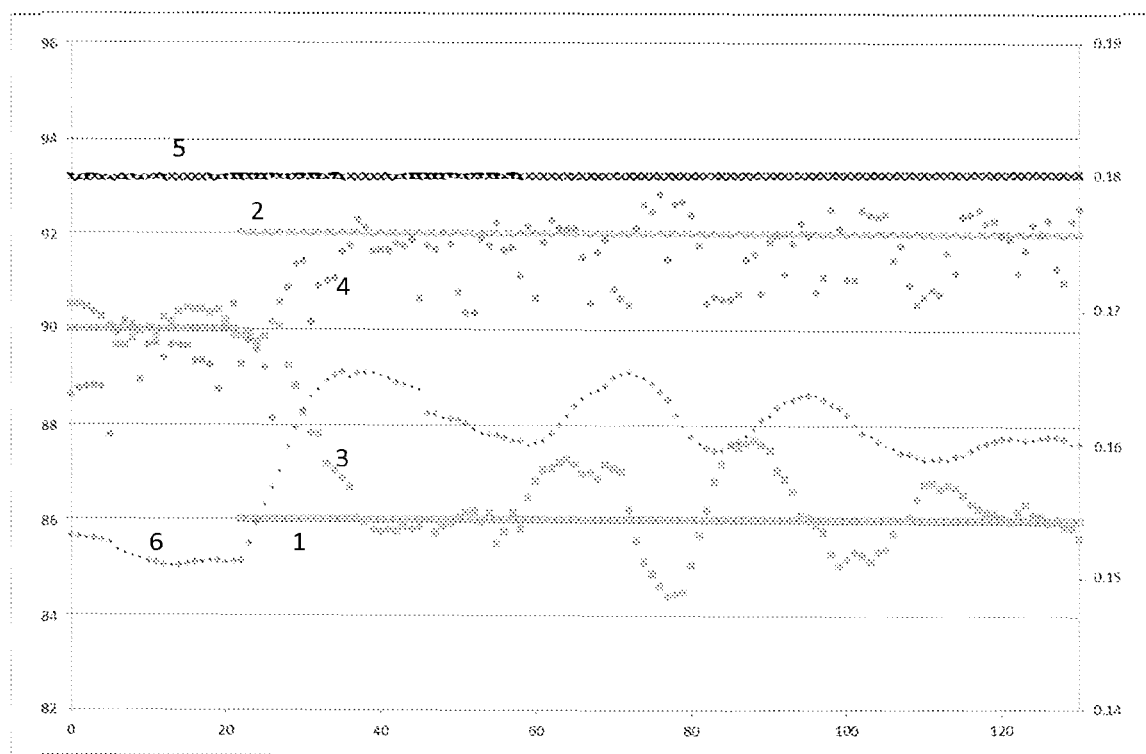

The results are summarized in FIG. 21.

The characteristic point of low concentration is regulated on the mean position of injection of the eluent. The volume of the mobile phase is thus kept constant and controlled.

The yield and purity objectives are met and the volume of charge injected is increased to +0.16 BV.

What is claimed is:

1. A method of separating a mixture in a system comprising a plurality of chromatography columns, the method successively comprising, in a cyclic manner, in a given part of the system:
   a step of collecting a raffinate, a step of injecting the mixture to be separated, a step of collecting an extract, and a step of injecting a mobile phase;
   wherein the method further comprises measuring the purity and/or yield of at least one collected fraction chosen from the extract and the raffinate, said measuring the purity and/or yield comprising the following steps:

the determination, in a node of the system, of the histories of at least two variables that are representative of the concentration of at least two species contained in the mixture to be separated, using at least one fast online detector;

the determination of the concentration of at least two species of the mixture to be separated in the collected fraction, based on these histories;

the determination of the purity and/or yield of the collected fraction based on these concentrations.

2. The method according to claim 1, comprising, after the step of determination of the histories of at least two variables that are representative of the concentration of at least two species contained in the mixture to be separated, a step of determination of the mean value of each variable over a measurement interval of the histories.

3. The method according to claim 2, wherein the measurement interval corresponds partly or in full to the collection of the collected fraction.

4. The method according to claim 1, comprising, after the step of determination of the histories of at least two variables that are representative of the concentration of at least two species contained in the mixture to be separated, a step of determination of the integration value of each variable over a measurement interval of the histories.

5. The method according to claim 4, wherein the measurement interval corresponds partly or in full to the collection of the collected fraction.

6. The method according to claim 1, wherein the at least one online fast detector is selected from the group consisting of UV/visible absorbance detectors measuring at one wavelength, UV/visible absorbance detectors measuring at several wavelengths, colorimeters, densimeters, conductometers, refractometers, Brix meters, polarimeters, nuclear magnetic resonance devices, near infrared spectrometers, infrared spectrometers, Fourier transform infrared spectrometers and Raman spectrometers.

7. The method according to claim 1, wherein the determination of the histories of at least two variables that are representative of the concentration of at least two species contained in the mixture to be separated is performed using at least two fast online detectors.

8. The method according to claim 7, wherein the at least two fast online detectors are at least a densimeter and a polarimeter.

9. The method according to claim 1, wherein the at least two species of the mixture to be separated are monosaccharides, and wherein the extract and raffinate are enriched with different monosaccharides.

10. The method according to claim 7, wherein the at least two fast online detectors are at least a densimeter and a conductometer.

11. The method according to claim 10, wherein the at least two species of the mixture to be separated are an ionized species and a non-ionized species, and wherein the extract and raffinate are enriched with different species.

12. The method according to claim 1, wherein the injection of the mixture to be separated is continuous or quasi-continuous.

13. The method according to claim 12, which is a four-zone simulated moving bed process.

14. The method according to claim 1, wherein the injection of the mixture to be separated is discontinuous.

15. The method according to claim 14, which is a sequential simulated moving bed process.

16. The method according to claim 1, further comprising:

the determination, in a node of the system, of the history of a variable that is representative of the concentration of one or more species contained in the mixture to be separated;

the detection on said history of a characteristic point between the start of a step of collecting the raffinate and the end of the following step of collecting the extract;

the comparison of the position of said characteristic point against a target position;

the adjustment of the volume carrying said characteristic point, modifying the position of said characteristic point to bring the position of said characteristic point closer to the target position.

17. The method according to claim 1, further comprising:

the determination, in a node of the system, of the history of a variable that is representative of the concentration of one or more species contained in the mixture to be separated;

the detection on the history of a first characteristic point between the start of the step of collecting the extract and the end of the following step of injecting the mobile phase;

the detection on the history of a second characteristic point between the start of the step of injecting the mobile phase and the end of the following step of collecting the raffinate;

the comparison of the position of each of the characteristic points against a respective target position;

the adjustment of the volume carrying the first characteristic point and the volume carrying the second characteristic point, modifying the position of the first characteristic point and the second characteristic point to bring them closer to their respective target positions.

18. The method according to claim 1, further comprising:

the determination, in a node of the system, of the history of a variable that is representative of the concentration of one or more species contained in the mixture to be separated;

the detection on said history of a characteristic point between the start of a step of collecting the extract and the end of the following step of collecting the raffinate;

the comparison of the position of said characteristic point against a target position;

the adjustment of the volume carrying said characteristic point, modifying the position of said characteristic point to bring the position of said characteristic point closer to the target position.

19. The method according to claim 1, further comprising a step of comparing the measured purity and/or yield with a target purity and/or yield.

20. The method according to claim 19, further comprising:

a step of modifying the injected volume per cycle of the mixture to be separated according to the difference between the measured purity and/or yield and the target purity and/or yield;

a step of modifying the injected volume per cycle of mobile phase according to the difference between the measured purity and/or yield and the target purity and/or yield;

a step of defining the target position(s) according to the difference between the measured purity and/or yield and the target purity and/or yield.

* * * * *